(12) United States Patent
Shi et al.

(10) Patent No.: US 11,864,245 B2
(45) Date of Patent: Jan. 2, 2024

(54) PHYSICAL RANDOM ACCESS CHANNEL PRACH RESOURCE PROCESSING METHOD AND APPARATUS

(71) Applicant: Huawei Technologies Co., Ltd., Shenzhen (CN)

(72) Inventors: Xiaoli Shi, Shanghai (CN); Hongzhuo Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 321 days.

(21) Appl. No.: 17/214,243

(22) Filed: Mar. 26, 2021

(65) Prior Publication Data
US 2021/0219340 A1 Jul. 15, 2021

Related U.S. Application Data

(63) Continuation of application No. PCT/CN2019/107248, filed on Sep. 23, 2019.

(30) Foreign Application Priority Data

Sep. 28, 2018 (CN) .......................... 201811146179.6
Feb. 14, 2019 (CN) .......................... 201910114628.7

(51) Int. Cl.
*H04W 74/08* (2009.01)
*H04W 74/00* (2009.01)
(Continued)

(52) U.S. Cl.
CPC ........ *H04W 74/085* (2013.01); *H04B 7/0695* (2013.01); *H04L 27/2607* (2013.01); *H04W 74/008* (2013.01); *H04W 76/19* (2018.02)

(58) Field of Classification Search
CPC . H04W 74/085; H04W 74/008; H04W 76/19; H04L 27/2607; H04B 7/0695
See application file for complete search history.

(56) References Cited

U.S. PATENT DOCUMENTS 10,182,457 B2   1/2019  Wang et al.
11,147,103 B2  10/2021  Hu et al.
(Continued)

FOREIGN PATENT DOCUMENTS

CN    101873712 A   10/2010
CN    102325382 A    1/2012
(Continued)

OTHER PUBLICATIONS

3GPP TS 38.423 V15.1.0 (Sep. 2018), 3rd Generation Partnership Project; Technical Specification Group Radio Access Network; NG-RAN; Xn application protocol (XnAP)(Release 15), 263 pages.
(Continued)

*Primary Examiner* — Derrick V Rose
(74) *Attorney, Agent, or Firm* — Slater Matsil, LLP

(57) ABSTRACT

This application discloses a physical random access channel (PRACH) resource processing method and an apparatus, to resolve a PRACH resource interference problem in a new radio NR system. The method in embodiments of this application includes: receiving, by a first access device, first information from a second access device, where the first information includes at least one of PRACH resource information of beam failure recovery (BFR), PRACH resource information of on-demand system information (OSI), and PRACH resource information of an uplink (UL) carrier; and performing, by the first access device, processing based on the first information.

20 Claims, 10 Drawing Sheets

(51) Int. Cl.
  *H04B 7/06* (2006.01)
  *H04W 76/19* (2018.01)
  *H04L 27/02* (2006.01)
  *H04L 27/26* (2006.01)

(56) References Cited

U.S. PATENT DOCUMENTS

2018/0138962 A1* 5/2018 Islam .................. H04B 7/0695
2018/0270859 A1   9/2018 Fan et al.
2019/0215749 A1* 7/2019 Shih ..................... H04W 36/18
2019/0394799 A1* 12/2019 Islam ................ H04W 72/1273

FOREIGN PATENT DOCUMENTS

| CN | 104254135 A  | 12/2014 |
|----|--------------|---------|
| CN | 108024385 A  | 5/2018  |
| WO | 2010002303 A1 | 1/2010  |
| WO | 2010071561 A1 | 6/2010  |
| WO | 2013111524 A1 | 8/2013  |
| WO | 2017135051 A1 | 8/2017  |

OTHER PUBLICATIONS

3GPP TS 38.473 V15.3.0 (Sep. 2018), 3rd Generation Partnership Project; Technical Specification Group Radio Access Network; NG-RAN; F1 application protocol (F1AP)(Release 15), 176 pages.
ZTE, "Discussion on mechanism to recovery from beam failure", 3GPP TSG RAN WG1 Meeting #90, R1-1712300, Aug. 21-25, 2017, 9 Pages, Prague, Czechia.
China Telecom, "Discussion on Remaining Issues of NR-LTE co-existence", 3GPP TSG-RAN WG1 Meeting NR#3, R1-1716454, Sep. 18-21, 2017, 6 Pages, Nagoya, Japan.
Huawei, "RACH optimisation in NR based on LTE", 3GPP TSG-RAN3 Meeting #104, R3-192963, May 13-17, 2019, 3 Pages, Reno, Nevada.
Huawei, "CR to TS 38.423 on RACH optimization solution", 3GPP TSG-RAN3 Meeting #105, R3-194092, Aug. 26-30, 2019, 7 Pages, Ljubljana, Slovenia.
"On PRACH resource indication and level determination during random access," Agenda Item: 6.2.1.10, Source: Huawei, HiSilicon, Document for: Discussion and decision, 3GPP TSG RAN WG1 Meeting #83, R1-156446, Anaheim, USA, Nov. 15-22, 2015, 6 pages.

* cited by examiner

PHYSICAL RANDOM ACCESS CHANNEL PRACH RESOURCE PROCESSING METHOD AND APPARATUS

CROSS-REFERENCE TO RELATED APPLICATIONS

This application is a continuation of International Application No. PCT/CN2019/107248, filed on Sep. 23, 2019, which claims priority to Chinese Patent Application No. 201811146179.6, filed on Sep. 28, 2018, and Chinese Patent Application No. 201910114628.7, filed on Feb. 14, 2019. All of the aforementioned patent applications are hereby incorporated by reference in their entireties.

TECHNICAL FIELD

This application relates to the communications field, and in particular, to a physical random access channel PRACH resource processing method and an apparatus.

BACKGROUND

Random access plays an important role in a long term evolution (LTE) system, and is a unique policy for user equipment to perform an initial connection, handover, connection reestablishment, and uplink synchronization recovery. A difference between a random access procedure and deterministic uplink and downlink scheduling is that the random access procedure is random. First, the user equipment (UE) selects a preamble sequence at a random moment for access. In addition, an access result is also random, and 100% success cannot be ensured. A random access control algorithm is used to ensure a random access success as much as possible and control uncertainty within an acceptable range.

In an existing solution, a physical random access channel (PRACH) algorithm is considered. The algorithm includes a ZC root sequence index automatic planning algorithm and a PRACH configuration index automatic planning algorithm. Through network planning, proper preamble indexes and with relatively large radii, and different preamble sequences are allocated to neighboring cells to reduce interference. Through network planning, proper PRACH configuration indexes are automatically allocated to a plurality of cells, to reduce PRACH interference between cells served by a same base station and total interference of neighboring cells served by different base stations.

However, a PRACH resource interference problem in a new radio (NR) system cannot be resolved in the existing solution.

SUMMARY

Embodiments of this application provide a physical random access channel PRACH resource processing method and an apparatus, to resolve a PRACH resource interference problem in a new radio NR system.

A first aspect of this application provides a physical random access channel PRACH resource processing method, including: receiving, by a first access device, first information from a second access device, where the first information includes at least one of PRACH resource information of beam failure recovery BFR, PRACH resource information of on-demand system information OSI, and PRACH resource information of an uplink UL carrier; and performing, by the first access device, processing based on the first information. In the embodiments of this application, the first access device receives the first information sent by the second access device, and optimizes a random access channel RACH based on the at least one, carried in the first information, of the PRACH resource information of the beam failure recovery BFR, the PRACH resource information of the on-demand system information OSI, and the PRACH resource information of the uplink UL carrier, thereby avoiding a conflict between at least one of BFR-specific PRACH resources, OSI-specific PRACH resources, and uplink UL carrier—specific PRACH resources of the first access device and the second access device.

In a possible design, in a second implementation of the first aspect of the embodiments of this application, the PRACH resource information of the uplink UL carrier includes PRACH resource information of a normal uplink carrier and/or PRACH resource information of a supplementary uplink carrier, thereby effectively avoiding a conflict between normal uplink carrier—specific PRACH resources and/or supplementary uplink carrier—specific PRACH resources.

In a possible design, in a third implementation of the first aspect of the embodiments of this application, the first information further includes common PRACH resource information, or common PRACH resource information and a long/short format indication of a common PRACH resource. A case in which the first information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a fourth implementation of the first aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fifth implementation of the first aspect of the embodiments of this application, the method further includes: sending, by the first access device, a first indication to the second access device, where the first indication includes at least one of a PRACH resource conflict indication, a PRACH resource conflict type, a candidate resource list of a PRACH resource, and a long/short format indication of the PRACH resource. A process in which the first access device sends the first indication to the second access device is added, so that the second access device can modify the PRACH resource information of the second access device according to the first indication, thereby avoiding a conflict between the PRACH resource information of the second access device and PRACH resource information of the first access device.

In a possible design, in a sixth implementation of the first aspect of the embodiments of this application, the PRACH resource conflict type includes at least one of a common PRACH resource conflict, a PRACH resource conflict of the BFR, a PRACH resource conflict of the OSI, and a PRACH resource conflict of the uplink carrier. A specific case of the PRACH resource conflict type is clarified, and efficiency of processing the first indication in the embodiments of this application is improved.

In a possible design, in a seventh implementation of the first aspect of the embodiments of this application, the PRACH resource conflict of the uplink carrier includes a PRACH resource conflict of the normal uplink carrier and/or a PRACH resource conflict of the supplementary uplink carrier.

In a possible design, in an eighth implementation of the first aspect of the embodiments of this application, the first indication further includes a candidate PRACH resource. A case in which the first indication carries the candidate PRACH resource is clarified, a range of PRACH resource searching is narrowed, and PRACH resource coordination efficiency is improved.

In a possible design, in a ninth implementation of the first aspect of the embodiments of this application, the first access device is a first new radio NR base station, and the second access device is a second NR base station; or
  the first access device is a central unit CU, and the second access device is a distributed unit DU; or the first access device is a distributed unit DU, and the second access device is a central unit CU; or
  the first access device is an NR base station, and the second access device is a long time evolution LTE base station; or
  the first access device is an LTE base station, and the second access device is an NR base station.

A second aspect of this application provides a physical random access channel PRACH resource processing method, including: determining, by a second access device, first information, where the first information includes at least one of PRACH resource information of beam failure recovery BFR, PRACH resource information of on-demand system information OSI, and PRACH resource information of an uplink UL carrier; and sending, by the second access device, the first information to a first access device. In the embodiments of this application, the second access device sends the first information to the first access device, where the first information carries the at least one of the PRACH resource information of the beam failure recovery BFR, the PRACH resource information of the on-demand system information OSI, and the PRACH resource information of the uplink UL carrier, so that the first access device optimizes a random access channel RACH, thereby avoiding a conflict between at least one of BFR-specific PRACH resources, OSI-specific PRACH resources, and uplink UL carrier—specific PRACH resources of the first access device and the second access device.

In a possible design, in a first implementation of the second aspect of the embodiments of this application, the PRACH resource information of the uplink UL carrier includes PRACH resource information of a normal uplink carrier and/or PRACH resource information of a supplementary uplink carrier, thereby effectively avoiding a conflict between normal uplink carrier—specific PRACH resources and/or supplementary uplink carrier—specific PRACH resources.

In a possible design, in a second implementation of the second aspect of the embodiments of this application, the first information further includes common PRACH resource information, or common PRACH resource information and a long/short format indication of a common PRACH resource. A case in which the first information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a third implementation of the second aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fourth implementation of the second aspect of the embodiments of this application, the method further includes: receiving, by the second access device, a first indication from the first access device, where the first indication includes at least one of a PRACH resource conflict indication, a PRACH resource conflict type, a candidate resource list of a PRACH resource, and a long/short format indication of the PRACH resource. A process in which the second access device receives the first indication from the first access device is added, so that the second access device can modify the PRACH resource information of the second access device according to the first indication, thereby avoiding a conflict between the PRACH resource information of the second access device and PRACH resource information of the first access device.

In a possible design, in a fifth implementation of the second aspect of the embodiments of this application, the PRACH resource conflict type includes at least one of a common PRACH resource conflict, a PRACH resource conflict of the BFR, a PRACH resource conflict of the OSI, and a PRACH resource conflict of the uplink carrier.

In a possible design, in a sixth implementation of the second aspect of the embodiments of this application, the PRACH resource conflict of the uplink carrier includes a PRACH resource conflict of the normal uplink carrier and/or a PRACH resource conflict of the supplementary uplink carrier.

In a possible design, in a seventh implementation of the second aspect of the embodiments of this application, the first indication further includes a candidate PRACH resource. A case in which the first indication carries the candidate PRACH resource is clarified, a range of PRACH resource searching is narrowed, and PRACH resource coordination efficiency is improved.

In a possible design, in an eighth implementation of the second aspect of the embodiments of this application, the first access device is a first new radio NR base station, and the second access device is a second NR base station; or
  the first access device is a central unit CU, and the second access device is a distributed unit DU; or the first access device is a distributed unit DU, and the second access device is a central unit CU; or
  the first access device is an NR base station, and the second access device is a long time evolution LTE base station; or
  the first access device is an LTE base station, and the second access device is an NR base station.

A third aspect of this application provides a physical random access channel PRACH resource processing method, including: obtaining, by a first access device, third information, where the third information includes PRACH resource information of at least one neighboring cell of a third access device, and the PRACH resource information includes at least one of PRACH resource information of beam failure recovery BFR, PRACH resource information of on-demand system information OSI, common PRACH resource information, and PRACH resource information of an uplink UL carrier; and sending, by the first access device, the third information to the third access device. Therefore, the third access device can optimize a random access channel RACH based on the third information, thereby avoiding a PRACH resource conflict between cells served by the first access device.

In a possible design, in a second implementation of the third aspect of the embodiments of this application, the PRACH resource information of the uplink UL carrier includes PRACH resource information of a normal uplink carrier and/or PRACH resource information of a supplementary uplink carrier.

In a possible design, in a third implementation of the third aspect of the embodiments of this application, the third information further includes a long/short format indication of a common PRACH resource. A case in which the third information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a fourth implementation of the third aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fifth implementation of the third aspect of the embodiments of this application, the third access device is one of at least one access device supported by the first access device, and the neighboring cell of the third access device is a neighboring cell of a cell served by the third access device.

In a possible design, in a sixth implementation of the third aspect of the embodiments of this application, the method further includes: obtaining, by the first access device, the PRACH resource information from a cell served by at least one of a neighboring base station, a fourth access device, and a fifth access device, where the fourth access device is an access device neighboring to the first access device, and the fifth access device is an access device neighboring to the third access device; and determining, by the first access device, the PRACH resource information of the neighboring cell of the third access device based on the obtained PRACH resource information. Therefore, the third access device can optimize the random access channel RACH based on the PRACH resource information of the neighboring cell of the third access device, thereby avoiding the PRACH resource conflict between the cells served by the first access device.

In a possible design, in a seventh implementation of the third aspect of the embodiments of this application, the PRACH resource information obtained by the first access device includes at least one neighboring degree, and the at least one neighboring degree is used to indicate a neighboring degree of a cell served by the first access device and the cell served by the at least one of the neighboring base station, the fourth access device, and the fifth access device. When the PRACH resource information includes the at least one neighboring degree, optimization on a physical random access channel PRACH resource is more accurate, and a possibility of the PRACH resource conflict between the cells served by the first access device is further reduced.

In a possible design, in an eighth implementation of the third aspect of the embodiments of this application, the first access device is a central unit CU, and the third access device is a distributed unit DU.

A fourth aspect of this application provides a physical random access channel PRACH resource processing method, including: receiving, by a third access device, third information from a first access device, where the third information includes PRACH resource information of at least one neighboring cell of the third access device, and the PRACH resource information includes at least one of PRACH resource information of beam failure recovery BFR, PRACH resource information of on-demand system information OSI, common PRACH resource information, and PRACH resource information of an uplink UL carrier; and performing, by the third access device, processing based on the third information. When the third access device performs processing based on the third information, the third access device can optimize a random access channel RACH based on the third information, thereby avoiding a PRACH resource conflict between cells served by the first access device.

In a possible design, in a second implementation of the fourth aspect of the embodiments of this application, the PRACH resource information of the uplink UL carrier includes PRACH resource information of a normal uplink carrier and/or PRACH resource information of a supplementary uplink carrier.

In a possible design, in a third implementation of the fourth aspect of the embodiments of this application, the third information further includes a long/short format indication of a common PRACH resource. A case in which the third information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a fourth implementation of the fourth aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fifth implementation of the fourth aspect of the embodiments of this application, the third access device is one of at least one access device supported by the first access device, and the neighboring cell of the third access device is a neighboring cell of a cell served by the third access device.

In a possible design, in a sixth implementation of the fourth aspect of the embodiments of this application, the method further includes: the PRACH resource information includes at least one neighboring degree, and the at least one neighboring degree is used to indicate a neighboring degree of a cell served by the first access device and a cell served by at least one of a neighboring base station, a fourth access device, and a fifth access device, where the fourth access device is an access device neighboring to the first access device, and the fifth access device is an access device neighboring to the third access device. The third access device can optimize the random access channel RACH based on the PRACH resource information of the neighboring cell of the third access device, thereby avoiding the PRACH resource conflict between the cells served by the first access device.

In a possible design, in a seventh implementation of the fourth aspect of the embodiments of this application, the first access device is a central unit CU, and the third access device is a distributed unit DU.

A fifth aspect of this application provides an access device. The access device is a first access device and includes: a receiving module, configured to receive first information from a second access device, where the first information includes at least one of PRACH resource information of beam failure recovery BFR, PRACH resource information of on-demand system information OSI, and PRACH resource information of an uplink UL carrier; and a processing module, configured to perform processing based on the first information, thereby avoiding a conflict between at least one of BFR-specific PRACH resources, OSI-specific PRACH resources, and uplink UL carrier— specific PRACH resources of the first access device and the second access device.

In a possible design, in a first implementation of the fifth aspect of the embodiments of this application, the PRACH resource information of the uplink UL carrier includes PRACH resource information of a normal uplink carrier and/or PRACH resource information of a supplementary uplink carrier, thereby avoiding a conflict between normal uplink carrier—specific PRACH resources and/or supplementary uplink carrier—specific PRACH resources of the first access device and the second access device.

In a possible design, in a second implementation of the fifth aspect of the embodiments of this application, the first information further includes common PRACH resource information, or common PRACH resource information and a long/short format indication of a common PRACH resource. A case in which the first information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a third implementation of the fifth aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fourth implementation of the fifth aspect of the embodiments of this application, the access device further includes: a sending module, configured to send a first indication to the second access device, where the first indication includes at least one of a PRACH resource conflict indication, a PRACH resource conflict type, a candidate resource list of a PRACH resource, and a long/short format indication of the PRACH resource. A process in which the first access device sends the first indication to the second access device is added, so that the second access device can modify the PRACH resource information of the second access device according to the first indication, thereby avoiding a conflict between the PRACH resource information of the second access device and PRACH resource information of the first access device.

In a possible design, in a fifth implementation of the fifth aspect of the embodiments of this application, the PRACH resource conflict type includes at least one of a common PRACH resource conflict, a PRACH resource conflict of the BFR, a PRACH resource conflict of the OSI, and a PRACH resource conflict of the uplink carrier. A specific case of the PRACH resource conflict type is clarified, and efficiency of processing the first indication in the embodiments of this application is improved.

In a possible design, in a sixth implementation of the fifth aspect of the embodiments of this application, the PRACH resource conflict of the uplink carrier includes a PRACH resource conflict of the normal uplink carrier and/or a PRACH resource conflict of the supplementary uplink carrier. A specific case of the PRACH resource conflict type is clarified, and efficiency of processing the first indication in the embodiments of this application is improved.

In a possible design, in an eighth implementation of the fifth aspect of the embodiments of this application, the first indication further includes a candidate PRACH resource. A case in which the first indication carries the candidate PRACH resource is clarified, a range of PRACH resource searching is narrowed, and PRACH resource coordination efficiency is improved.

In a possible design, in a ninth implementation of the fifth aspect of the embodiments of this application, the first access device is a first new radio NR base station, and the second access device is a second NR base station; or the first access device is a central unit CU, and the second access device is a distributed unit DU; or the first access device is a distributed unit DU, and the second access device is a central unit CU; or the first access device is an NR base station, and the second access device is a long time evolution LTE base station; or the first access device is an LTE base station, and the second access device is an NR base station.

A sixth aspect of this application provides an access device. The access device is a second access device and includes: a determining module, configured to determine first information, where the first information includes at least one of PRACH resource information of beam failure recovery BFR, PRACH resource information of on-demand system information OSI, and PRACH resource information of an uplink UL carrier; and a sending module, configured to send the first information to a first access device, so that the first access device optimizes a random access channel RACH, thereby avoiding a conflict between at least one of BFR-specific PRACH resources, OSI-specific PRACH resources, and uplink UL carrier—specific PRACH resources of the first access device and the second access device.

In a possible design, in a first implementation of the sixth aspect of the embodiments of this application, the PRACH resource information of the uplink UL carrier includes PRACH resource information of a normal uplink carrier and/or PRACH resource information of a supplementary uplink carrier, thereby avoiding a conflict between normal uplink carrier—specific PRACH resources and/or supplementary uplink carrier—specific PRACH resources of the first access device and the second access device.

In a possible design, in a second implementation of the sixth aspect of the embodiments of this application, the first information further includes common PRACH resource information, or common PRACH resource information and a long/short format indication of a common PRACH resource. A case in which the first information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a third implementation of the sixth aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fourth implementation of the sixth aspect of the embodiments of this application, the access device further includes: a receiving module, configured to receive a first indication from the first access device, where the first indication includes at least one of a PRACH resource conflict indication, a PRACH resource conflict type, a candidate resource list of a PRACH resource, and a long/short format indication of the PRACH resource. A process in which the second access device receives the first indication from the first access device is added, so that the second access device can modify the PRACH resource information of the second access device according to the first indication, thereby avoiding a conflict between the PRACH resource information of the second access device and PRACH resource information of the first access device.

In a possible design, in a fifth implementation of the sixth aspect of the embodiments of this application, the PRACH resource conflict type includes at least one of a common PRACH resource conflict, a PRACH resource conflict of the BFR, a PRACH resource conflict of the OSI, and a PRACH resource conflict of the uplink carrier. A specific case of the PRACH resource conflict type is clarified, and efficiency of processing the first indication in the embodiments of this application is improved.

In a possible design, in a sixth implementation of the sixth aspect of the embodiments of this application, the PRACH resource conflict of the uplink carrier includes a PRACH resource conflict of the normal uplink carrier and/or a PRACH resource conflict of the supplementary uplink carrier.

In a possible design, in a seventh implementation of the sixth aspect of the embodiments of this application, the first indication further includes a candidate PRACH resource. A case in which the first indication carries the candidate PRACH resource is clarified, a range of PRACH resource searching is narrowed, and PRACH resource coordination efficiency is improved.

In a possible design, in an eighth implementation of the sixth aspect of the embodiments of this application, the first access device is a first new radio NR base station, and the second access device is a second NR base station; or the first access device is a central unit CU, and the second access device is a distributed unit DU; or the first access device is a distributed unit DU, and the second access device is a central unit CU; or the first access device is an NR base station, and the second access device is a long time evolution LTE base station; or the first access device is an LTE base station, and the second access device is an NR base station.

A seventh aspect of this application provides an access device. The access device is a first access device and includes: an obtaining module, configured to obtain third information, where the third information includes PRACH resource information of at least one neighboring cell of a third access device, and the PRACH resource information includes at least one of PRACH resource information of beam failure recovery BFR, PRACH resource information of on-demand system information OSI, common PRACH resource information, and PRACH resource information of an uplink UL carrier; and a sending module, used by the device to send the third information to the third access device. Therefore, the third access device can optimize a random access channel RACH based on the third information, thereby avoiding a PRACH resource conflict between cells served by the first access device.

In a possible design, in a second implementation of the seventh aspect of the embodiments of this application, the PRACH resource information of the uplink UL carrier includes PRACH resource information of a normal uplink carrier and/or PRACH resource information of a supplementary uplink carrier, thereby avoiding the PRACH resource conflict between the cells served by the first access device.

In a possible design, in a third implementation of the seventh aspect of the embodiments of this application, the third information further includes a long/short format indication of a common PRACH resource. A case in which the third information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a fourth implementation of the seventh aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fifth implementation of the seventh aspect of the embodiments of this application, the third access device is one of at least one access device supported by the first access device, and the neighboring cell of the third access device is a neighboring cell of a cell served by the third access device.

In a possible design, in a sixth implementation of the seventh aspect of the embodiments of this application, the obtaining module includes: a first obtaining submodule, configured to obtain the PRACH resource information from a cell served by at least one of a neighboring base station, a fourth access device, and a fifth access device, where the fourth access device is an access device neighboring to the first access device, and the fifth access device is an access device neighboring to the third access device; and a second obtaining submodule, configured to determine the PRACH resource information of the neighboring cell of the third access device based on the obtained PRACH resource information. Therefore, the third access device can optimize the random access channel RACH based on the PRACH resource information of the neighboring cell of the third access device, thereby avoiding the PRACH resource conflict between the cells served by the first access device.

In a possible design, in a seventh implementation of the seventh aspect of the embodiments of this application, the PRACH resource information obtained by the first obtaining submodule includes at least one neighboring degree, and the at least one neighboring degree is used to indicate a neighboring degree of a cell served by the first access device and the cell served by the at least one of the neighboring base station, the fourth access device, and the fifth access device. When the PRACH resource information includes the at least one neighboring degree, optimization on a physical random access channel PRACH resource configuration is more accurate, and a possibility of the PRACH resource conflict between the cells served by the first access device is further reduced.

In a possible design, in an eighth implementation of the seventh aspect of the embodiments of this application, the first access device is a central unit CU, and the third access device is a distributed unit DU.

An eighth aspect of this application provides an access device. The access device is a third access device and includes: a receiving module, configured to receive third information from a first access device, where the third information includes PRACH resource information of at least one neighboring cell of the third access device, and the PRACH resource information includes at least one of PRACH resource information of beam failure recovery BFR, PRACH resource information of on-demand system information OSI, common PRACH resource information, and PRACH resource information of an uplink UL carrier; and a processing module, configured to perform processing based on the third information. The third access device can optimize a random access channel RACH based on the third information, thereby avoiding a PRACH resource conflict between cells served by the first access device.

In a possible design, in a second implementation of the eighth aspect of the embodiments of this application, the PRACH resource information of the uplink UL carrier includes PRACH resource information of a normal uplink carrier and/or PRACH resource information of a supplementary uplink carrier.

In a possible design, in a third implementation of the eighth aspect of the embodiments of this application, the third information further includes a long/short format indication of a common PRACH resource. A case in which the third information may carry the common PRACH resource information or the long/short format indication of the common PRACH resource is added, so that a necessary condition is provided for implementing a process of initially accessing a network in the embodiments of this application, thereby improving PRACH resource coordination efficiency.

In a possible design, in a fourth implementation of the eighth aspect of the embodiments of this application, the PRACH resource information includes at least one of a root sequence index, a cyclic shift, a high speed flag, a PRACH frequency offset, and a PRACH configuration index. The PRACH resource information is specifically refined, so that in the embodiments of this application, coordination can be performed on a specific PRACH resource, thereby improving PRACH resource coordination efficiency.

In a possible design, in a fifth implementation of the eighth aspect of the embodiments of this application, the third access device is one of at least one access device supported by the first access device, and the neighboring cell of the third access device is a neighboring cell of a cell served by the third access device.

In a possible design, in a sixth implementation of the eighth aspect of the embodiments of this application, the PRACH resource information includes at least one neighboring degree, and the at least one neighboring degree is used to indicate a neighboring degree of a cell served by the first access device and a cell served by at least one of a neighboring base station, a fourth access device, and a fifth access device, where the fourth access device is an access device neighboring to the first access device, and the fifth access device is an access device neighboring to the third access device. The third access device can optimize the random access channel RACH based on the PRACH resource information of the neighboring cell of the third access device, thereby avoiding the PRACH resource conflict between the cells served by the first access device.

In a possible design, in a seventh implementation of the eighth aspect of the embodiments of this application, the first access device is a central unit CU, and the third access device is a distributed unit DU.

A ninth aspect of this application provides an access device, including a memory, a processor, and a bus system. The memory is configured to store a program. The processor is configured to execute the program in the memory, and is configured to perform the methods in the foregoing aspects.

A tenth aspect of this application provides a computer-readable storage medium. The computer-readable storage medium stores an instruction, and when the instruction is run on a computer, the computer is enabled to perform the methods in the foregoing aspects.

An eleventh aspect of this application provides a computer program product including an instruction. When the computer program product runs on a computer, the computer is enabled to perform the methods in the foregoing aspects.

A twelfth aspect of this application provides a communications system, including the first access device provided in the fifth aspect and the second access device provided in the sixth aspect.

A thirteenth aspect of this application provides a communications system, including the first access device provided in the seventh aspect and the third access device provided in the eighth aspect.

DETAILED DESCRIPTION OF ILLUSTRATIVE EMBODIMENTS

Figure 1:
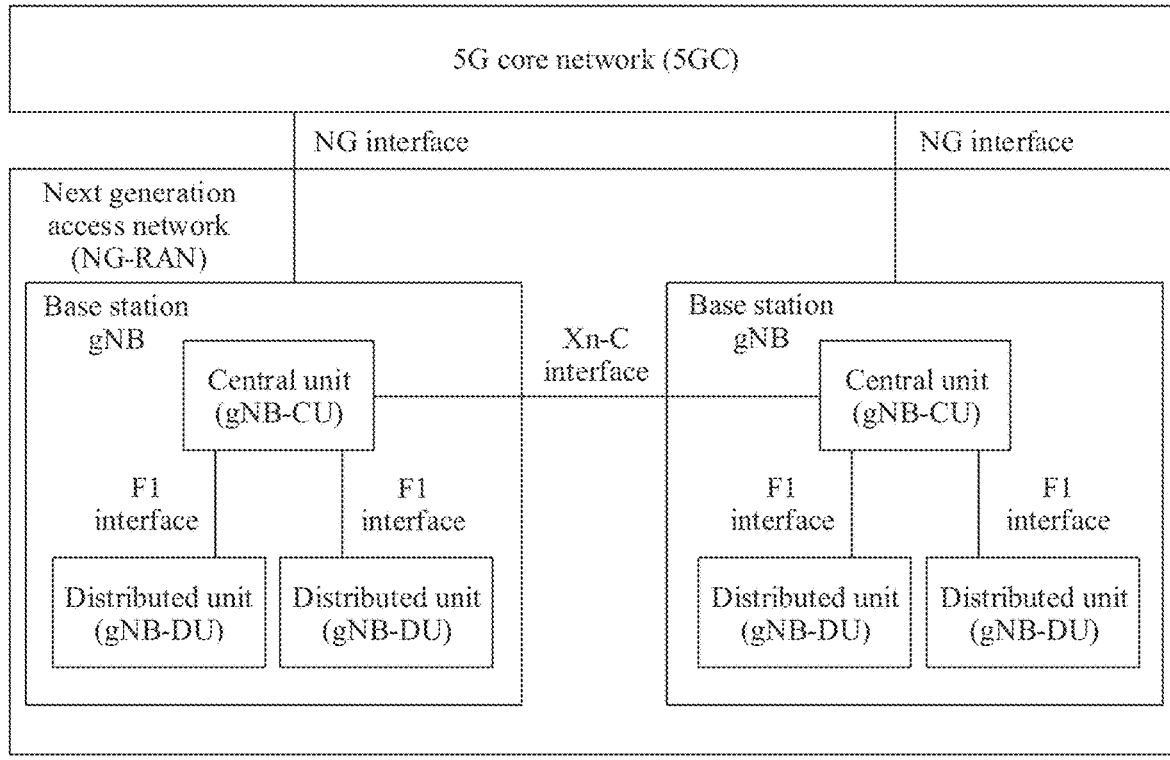
FIG. 1 is a schematic diagram of a network architecture according to an embodiment of this application.

Embodiments of this application provide a PRACH resource processing method and an apparatus, to resolve a physical random access channel PRACH resource interference problem in a new radio NR system.

To make a person skilled in the art understand the technical solutions in this application better, the following describes the embodiments of this application with reference to the accompanying drawings in the embodiments of this application.

The terms "first", "second", "third", "fourth", and the like (if existent) mentioned in this application document are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device.

In an existing solution, for random access channel (RACH) resource selection in a random access procedure, user equipment (UE) needs to select a physical random access channel (PRACH) for transmitting a random preamble sequence, or transmit a dedicated preamble sequence by using a PRACH notified by a base station, and an available PRACH in each frame of a cell depends on a PRACH configuration configured for the cell. The algorithm is intended to allocate a proper PRACH configuration index to the cell to reduce intra-base-station cell PRACH interference and total inter-base-station interference, for example, inter-PRACH interference and interference caused by a physical uplink shared channel (PUSCH) to a PRACH.

Because preamble sequences in a long/short format are introduced in a new radio (NR) and most cells in NR are high-frequency cells, short sequences are mostly used. Consequently, a preamble sequence conflict may be larger. In addition, because a concept of a beam is introduced in the NR system, the random access procedure has a problem of how to select a beam.

In the embodiments of this application, the beam may be understood as a spatial resource, and may be a transmit or receive precoding vector having energy transmission directivity. In addition, the transmit or receive precoding vector can be identified by using index information. The index information may correspond to an identity (ID) of a resource configured for a terminal. For example, the index information may correspond to an identity or a resource of a configured CSI-RS, or may correspond to an identity or a resource of a configured uplink sounding reference signal (SRS). Optionally, the index information may alternatively be index information explicitly or implicitly carried by a signal or a channel that is carried by the beam. The energy transmission directivity may mean that the precoding vector is used to perform precoding processing on a signal that needs to be sent, so that the signal obtained after the precoding processing has specific spatial directivity, and that a received signal obtained after the precoding processing is performed by using the precoding vector has relatively good received power, for example, satisfies a received demodulation signal-to-noise ratio. The energy transmission directivity may also mean that same signals that are sent from different spatial positions and received by using the precoding vector have different received power. Optionally, a same communications apparatus (for example, a terminal device or a network device) may have different precoding vectors, and different devices may also have different precoding vectors, that is, correspond to different beams. For a configuration or a capability of a communications apparatus, one communications apparatus may simultaneously use one or more of a plurality of different precoding vectors, that is, one or more beams may be simultaneously formed. In this application, a beam sent by the network device to the terminal device is referred to as a downlink beam, and a beam sent by the terminal device to the network device is referred to as an uplink beam. A beam may be configured through RRC, an SSB is sent to the UE through a broadcast message, and a CSI-RS may be configured for the UE through radio resource control (RRC) dedicated signaling. Two thresholds (rsrp-ThresholdSSB, csirs-Threshold) are respectively configured for the SSB and the CSI-RS. The two thresholds are used by the UE to select a beam. A network side may configure SSB-based or CSI-RS—based measurement information for the UE. The UE measures SSB reference signal received power (synchronization signal block reference signal received power, SSB-RSRP) or CSI reference signal received power (CSI-RSRP). When SSB-RSRP signal quality of the UE exceeds an RSRP threshold of the SSB, the UE selects a preamble sequence corresponding to the SSB for random access.

In the embodiments of this application, a supplementary uplink carrier is a new definition introduced in the NR system. To be specific, one cell may have at least one downlink carrier and at least one uplink carrier. For example, one cell may have one downlink carrier and two uplink carriers. Descriptions of a quantity of uplink carriers of a cell and a quantity of downlink carriers of the cell in this application are optional descriptions, and are not specifically limited. The UE may select any uplink carrier for data transmission. Uplink carriers may include a normal uplink (UL) carrier and a supplementary uplink (SUL) carrier. When the terminal device performs initial random access, the terminal device may compare measured SUL reference signal strength with an SUL reference signal received power threshold (which is specifically, for example, rsrpthreshold-SUL), and therefore determine to select the normal UL carrier or the SUL carrier. For example, the SUL reference signal received power threshold may be configured by a radio access network device for the terminal device through RRC signaling. For example, the radio access network device sends rsrpthresholdSUL to the terminal device through broadcast information, and rsrpthresholdSUL is used by the terminal device to select the SUL or UL during initial random access. Alternatively, when the terminal device is in a handover scenario, the radio access network device may indicate, through dedicated signaling, the terminal device to use the UL or the SUL, or use both the UL and the SUL. The uplink carriers in this application may include the normal uplink carrier and/or the supplementary uplink carrier.

In the NR system, if the existing solution is still used, problems caused by introduction of the long/short format, a beam failure recovery (BFR)—specific PRACH resource, an uplink carrier—specific PRACH resource, and the like in the NR system, and PRACH resource coordination problems existing in solutions used in a central unit—distributed unit (CU-DU) scenario, an LTE and NR multi-connectivity (E-UTRA-NR dual connectivity, EN-DC) scenario, and the like, cannot be resolved.

The embodiments of this application may be used in a standalone (SA) scenario in the NR system, an NR CU-DU scenario, an EN-DC scenario, a multi-RAT multi-connectivity (MR-DC) scenario, and the like. For example, in a CU-DU network architecture shown in FIG. 1, a central unit (gNB-CU) of an NR base station and a distributed unit (gNB-DU) of the NR base station are connected through an F1 interface, gNBs are connected through an Xn interface, and the gNB and an NR core network (5G core network, 5GC) are connected through an NG interface. A possible implementation of the CU and the DU is to perform division based on a protocol stack function. For example, the CU has functions above a packet data convergence protocol (PDCP) layer. The functions specifically include a service data adaptation (SDAP) layer function, a PDCP layer function, and a radio resource control (RRC) function. The DU has functions below the PDCP layer. The functions specifically include a radio link control (RLC) function, a medium access control (MAC) MAC function, and a physical layer (PHY) function.

It should be noted that the embodiments of this application may be further extended to a multi-hop relay scenario, for example, a scenario in which the DU may be a relay device, or transmission is performed between the DU and the UE through a relay device. The embodiments of this application may be further used in another multi-connectivity data transmission scenario. This is not specifically limited herein.

Embodiment 1

Figure 2:
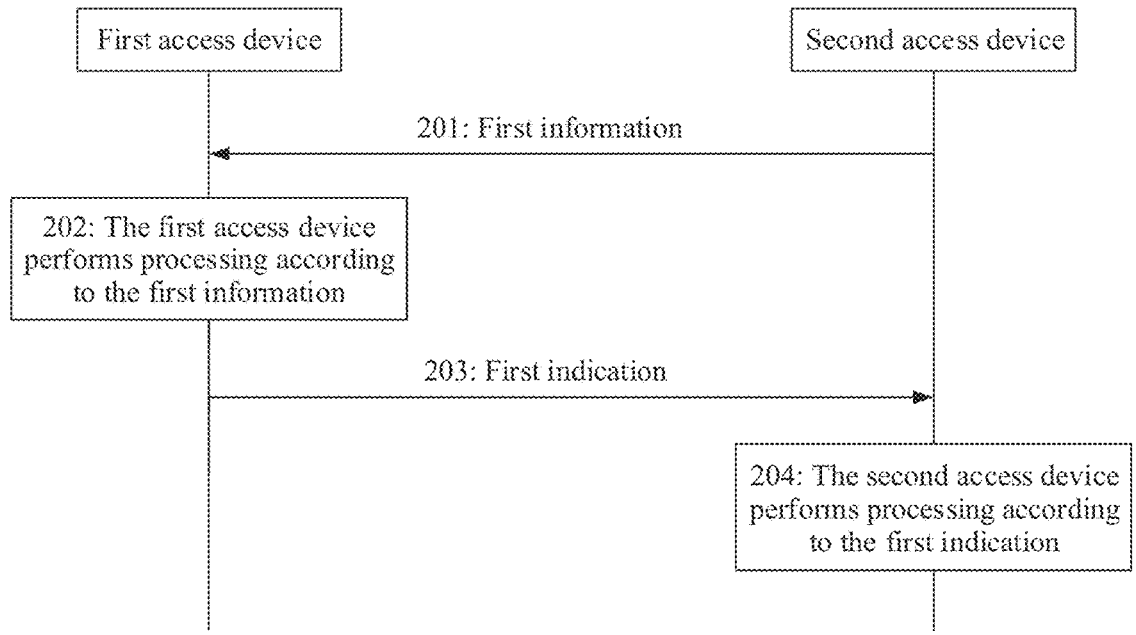
FIG. 2 is a schematic diagram of an embodiment of a physical random access channel PRACH resource processing method according to an embodiment of this application.

For ease of understanding, the following describes a specific procedure in the embodiments of this application. Referring to FIG. 2, an embodiment of the PRACH resource processing method in the embodiments of this application includes the following steps.

201: A second access device sends first information to a first access device.

The first access device may be a first radio access network device, the second access device may be a second radio access network device, and there is a connection between the first access device and the second access device.

In this embodiment of this application, the first access device and the second access device are used as an example for description. The second access device sends the first information to the first access device. The first information includes one or more of PRACH resource information of beam failure recovery (BFR), PRACH resource information of on-demand system information (OSI), and PRACH resource information of an uplink UL carrier.

Optionally, the PRACH resource information of the uplink UL carrier includes PRACH resource information of a normal uplink carrier and PRACH resource information of a supplementary uplink carrier.

For example, the first information may separately include the PRACH resource information of the BFR, the first information may separately include the PRACH resource information of the OSI, the first information may separately include the PRACH resource information of the uplink UL carrier, the first information may separately include the PRACH resource information of the normal uplink carrier, or the first information may separately include the PRACH resource information of the supplementary uplink carrier.

For another example, the first information may further include at least two or more of the PRACH resource information of the BFR, the PRACH resource information of the OSI, and the PRACH resource information of the uplink carrier.

Optionally, a PRACH resource of the BFR may be considered as a BFR-specific PRACH, a PRACH resource of the OSI may be considered as an OSI-specific PRACH, a PRACH resource of the uplink carrier may be considered as an uplink carrier—specific PRACH resource, a PRACH resource of the normal uplink carrier may be considered as a normal uplink carrier—specific PRACH resource, and a PRACH resource of the supplementary uplink carrier may be considered as a supplementary uplink carrier—specific PRACH resource.

In this embodiment of this application, the PRACH resource information may also be referred to as PRACH resource configuration information, a PRACH resource configuration, or another term. This is not limited herein in this application.

Optionally, the first information may further include common PRACH resource information, or include both common PRACH resource information and a long/short format indication of a common PRACH resource. The common PRACH resource information may be understood as PRACH resource information universal for the second access device or each cell served by the second access device, that is, PRACH resource information universal for the BFR, the OSI, the uplink carrier, or the supplementary uplink carrier. The common PRACH resource is used in a process in which UE initially accesses a network.

For an NR system, the BFR is usually in a short format, and a format of the OSI is similar to a long/short format of the common PRACH resource and may be a long format or a short format. Optionally, the PRACH resource information includes at least one of a root sequence index (RootSequenceIndex), a cyclic shift (ZeroCorrelationZoneConfiguration), a high speed flag (HighSpeedFlag), a PRACH frequency offset (PRACH-FrequencyOffset), and a PRACH configuration index (PRACH-ConfigurationIndex). For example, the PRACH resource information may include only the root sequence index, may include only the cyclic shift, may include both the root sequence index and the cyclic shift, or may include all of the root sequence index, the cyclic shift, the high speed flag, the PRACH frequency offset, and the PRACH configuration index. The first information only needs to carry at least one of the foregoing parameters, and the PRACH resource information may be another different combination. For example, the PRACH resource information includes the PRACH frequency offset, the PRACH configuration index, and the like. This is not specifically limited herein. Each parameter included in the PRACH resource information may be a parameter, in another form, that has a same function. This is not specifically limited herein.

It should be noted that, the PRACH resource information of the BFR, the PRACH resource information of the OSI, the PRACH resource information of the uplink UL carrier, and the common PRACH resource information may be the same, or may be different. An example in which included parameters are different is used below. For example, the PRACH resource information, included in the first information, of the BFR includes at least one of a root sequence index of the BFR (RootSequenceIndex-BFR), a cyclic shift of the BFR (ZeroCorrelationZoneConfiguration-BFR), a high speed flag of the BFR (HighSpeedFlag-BFR), a PRACH frequency offset of the BFR (PRACH-FrequencyOffset-BFR), and a PRACH configuration index of the BFR (PRACH-ConfigurationIndex-BFR). For another example, the PRACH resource information, included in the first information, of the OSI includes at least one of a root sequence index of the OSI (RootSequenceIndex-OSI), a cyclic shift of the OSI (ZeroCorrelationZoneConfiguration-OSI), a high speed flag of the OSI (HighSpeedFlag-OSI), a PRACH frequency offset of the OSI (PRACH-FrequencyOffset-OSI), and a PRACH configuration index of the OSI (PRACH-ConfigurationIndex-OSI). For another example, the PRACH resource information, included in the first information, of the uplink UL carrier includes at least one of a root sequence index of the uplink carrier (RootSequenceIndex-uplink carrier), a cyclic shift of the uplink carrier (ZeroCorrelationZoneConfiguration-uplink carrier), a high speed flag of the uplink carrier (HighSpeedFlag-uplink carrier), a PRACH frequency offset of the uplink carrier (PRACH-FrequencyOffset-uplink carrier), and a PRACH configuration index of the uplink carrier (PRACH-ConfigurationIndex-uplink carrier). For another example, the PRACH resource information, included in the first information, of the normal uplink carrier includes at least one of a root sequence index of the normal uplink carrier (RootSequenceIndex-normal uplink carrier), a cyclic shift of the normal uplink carrier (ZeroCorrelationZoneConfiguration-normal uplink carrier), a high speed flag of the normal uplink carrier (HighSpeedFlag-normal uplink carrier), a PRACH frequency offset of the normal uplink carrier (PRACH-FrequencyOffset-normal uplink carrier), and a PRACH configuration index of the normal uplink carrier (PRACH-ConfigurationIndex-normal uplink carrier). For another example, the PRACH resource information, included in the first information, of the supplementary uplink carrier includes at least one of a root sequence index of the supplementary uplink carrier (RootSequenceIndex-supplementary uplink carrier), a cyclic shift of the supplementary uplink carrier (ZeroCorrelationZoneConfiguration-supplementary uplink carrier), a high speed flag of the supplementary uplink carrier (HighSpeedFlag-supplementary uplink carrier), a PRACH frequency offset of the supplementary uplink carrier (PRACH-FrequencyOffset-supplementary uplink carrier), and a PRACH configuration index of the supplementary uplink carrier (PRACH-ConfigurationIndex-supplementary uplink carrier).

Optionally, the PRACH resource information of the BFR, the PRACH resource information of the OSI, the PRACH resource information of the uplink UL carrier, and the common PRACH resource information may be a candidate resource list. This is not limited in this application.

In a possible manner, PRACH resources used by the first access device and the second access device may be configured by using a network managing device, or may be configured by using another central node. This is not specifically limited herein.

It may be understood that, the PRACH resource mentioned in the PRACH resource information of the BFR may be considered as a BFR-specific resource, and the PRACH resource mentioned in the PRACH resource information of the OSI may be considered as an OSI-specific resource. The PRACH resource mentioned in the PRACH resource information of the uplink UL carrier may be considered as an uplink carrier—specific resource.

It should be noted that, a configuration of the RootSequenceIndex of the OSI is usually the same as that of common RootSequenceIndex.

Optionally, the first information may be carried for sending in an interface message transmitted between the first access device and the second access device. The interface message may be an Xn interface message of NR. The Xn interface message may be an existing Xn interface message, including a user equipment—associated (UE-associated) signaling message and a non user equipment—associated (non UE-associated) message, or may be a newly defined Xn interface message. This is not limited herein in this application. For example, the first information is included in an Xn setup request message/response message, an Xn setup request message, a base station configuration update message, or a base station configuration update response message, for example, is included in cell information in the message. Optionally, when the first information is any one of the PRACH resource information of the BFR, the PRACH resource information of the OSI, the PRACH resource information of the uplink UL carrier, and the common PRACH resource, the PRACH resource information of the BFR, the PRACH resource information of the OSI, the PRACH resource information of the uplink UL carrier, and the common PRACH resource information may be respectively transmitted through different Xn interface messages.

202: The first access device performs processing based on the first information.

There may be a plurality of different implementations in which the first access device performs processing based on the first information. For example, the first access device (namely, a first radio access network device) may use the first information to optimize a random access channel (RACH), the first access device may use the first information to coordinate a RACH, or the first access device may use the first information to reconfigure a RACH. Specifically, that the first access device uses the first information to optimize a random access channel (RACH) may be: the first access device uses the first information to optimize a PRACH resource configuration.

That the first access device uses the first information to optimize a PRACH resource configuration may include: The first access device determines whether a PRACH resource configuration of the first access device conflicts with a PRACH resource configuration of the second access device. If the PRACH resource configuration of the first access device conflicts with the PRACH resource configuration of the second access device, the first access device may modify the PRACH resource configuration of the first access device to a new PRACH resource configuration, or the first access device may modify the PRACH resource configuration of the second access device to a new PRACH resource configuration, and send the new PRACH resource configuration to the second access device, where the new PRACH resource configuration does not conflict with the PRACH resource configuration of the second access device. Alternatively, the first access device sends the first information to the second access device, to indicate the second access device to modify the PRACH resource configuration of the second access device to a new PRACH resource configuration, where the new PRACH resource configuration does not conflict with the PRACH resource configuration of the first access device.

It should be noted that the PRACH resource conflict means that at least one or more of the root sequence index (RootSequenceIndex), the cyclic shift (ZeroCorrelationZoneConfiguration), the high speed flag (HighSpeedFlag), the PRACH frequency offset (PRACH-FrequencyOffset), and the PRACH configuration index (PRACH-ConfigurationIndex) are configured to be the same. For example, if a high speed flag of the first access device is the same as a high speed flag of the second access device, it may be determined that a PRACH resource conflict occurs between the first access device and the second access device. For another example, if a high speed flag of the first access device is the same as a high speed flag of the second access device, and a cyclic shift of the first access device is the same as a cyclic shift of the second access device, in other words, the high speed flags are configured to be the same and the cyclic shifts are configured to be the same, it is determined that a PRACH resource conflict occurs between the first access device and the second access device.

Optionally, a PRACH resource conflict of the BFR means that at least one or more of the root sequence index of the BFR (RootSequenceIndex-BFR), the cyclic shift of the BFR (ZeroCorrelationZoneConfiguration-BFR), the high speed flag of the BFR (HighSpeedFlag-BRF), the PRACH frequency offset of the BFR (PRACH-FrequencyOffset-BFR), and the PRACH configuration index of the BFR (PRACH-ConfigurationIndex-BFR) are configured to be the same.

Optionally, a PRACH resource conflict of the OSI means that at least one or more of the root sequence index of the OSI (RootSequenceIndex-OSI), the cyclic shift of the OSI (ZeroCorrelationZoneConfiguration-OSI), the high speed flag of the OSI (HighSpeedFlag-OSI), the PRACH frequency offset of the OSI (PRACH-FrequencyOffset-OSI), and the PRACH configuration index of the OSI (PRACH-ConfigurationIndex-OSI) are configured to be the same.

Optionally, a PRACH resource conflict of the normal uplink carrier means that at least one or more of the root sequence index of the normal uplink carrier, the cyclic shift of the normal uplink carrier, the high speed flag of the normal uplink carrier, the PRACH frequency offset of the normal uplink carrier, and the PRACH configuration index of the normal uplink carrier are configured to be the same.

Optionally, a PRACH resource conflict of the supplementary uplink carrier means that at least one or more of the root sequence index of the supplementary uplink carrier, the cyclic shift of the supplementary uplink carrier, the high speed flag of the supplementary uplink carrier, the PRACH frequency offset of the supplementary uplink carrier, and the PRACH configuration index of the supplementary uplink carrier are configured to be the same.

It should be noted that the PRACH resource conflict described in this application may also be referred to as PRACH resource overlapping or another name, and means that a PRACH resource configuration is improper. This is not limited in this embodiment of this application.

Optionally, if the first access device modifies the PRACH resource configuration, the first access device may send, to the second access device, a new PRACH resource configuration obtained after modification.

Alternatively, if the second access device modifies the PRACH resource configuration, the following step 203 and step 204 may be further performed.

For another example, the first access device may obtain PRACH resource information of a neighboring cell and/or a neighboring degree, so that the first access device optimizes the PRACH resource configuration according to indications for the PRACH resource information of the neighboring cell and the neighboring degree, or the first access device may send indications for the PRACH resource information of the neighboring cell and the neighboring degree to OAM, and the OAM optimizes the PRACH resource configuration. Specifically, the neighboring degree may be one or more of direct neighboring, indirect neighboring, and a specific distance, and the neighboring degree may be identified by using 0, 1, 2, or the like (where 0 represents the direct neighboring, 1 represents the indirect neighboring, and 2 represents the specific distance). Alternatively, the neighboring degree may be represented in another manner. This is not limited herein in this application.

203: The first access device sends a first indication to the second access device, where the first indication is used to indicate the second access device to optimize the random access channel RACH.

In a possible manner, the first indication includes at least one of a PRACH resource conflict indication (or a PRACH resource configuration optimization indication), a PRACH resource conflict type (or a PRACH resource configuration optimization type), a candidate resource list of a PRACH resource, and a long/short format indication of the PRACH resource.

Optionally, the first indication may be sent through an interface message transmitted between the first access device and the second access device. The interface message may be an existing Xn interface message, or may be a new Xn interface message, for example, a PRACH optimization request message. This is not limited herein in this application.

It may be understood that, when the first access device determines, by using the received first information, whether the random access channel (RACH) needs to be optimized, where specifically, the optimization of the random access channel (RACH) shown in this application may be optimization of the PRACH resource configuration, if the first access device considers that the second access device needs to optimize the PRACH resource configuration, the first access device sends the first indication to the second access device.

Optionally, the first indication includes the PRACH resource conflict indication, and the PRACH resource conflict indication is used to indicate that a PRACH resource of the first access device conflicts with a PRACH resource of the second access device.

Optionally, the first indication may include the PRACH resource conflict type, and the PRACH resource conflict type includes at least one of a common PRACH resource conflict, the PRACH resource conflict of the BFR, the PRACH resource conflict of the OSI, a PRACH resource conflict of the uplink carrier, the PRACH resource conflict of the normal uplink carrier, and the PRACH resource conflict of the supplementary uplink carrier. For example, if the first indication includes the PRACH resource conflict of the BFR, after receiving the first indication, the second access device needs to optimize a BFR PRACH resource configuration of the second access device.

Optionally, the first indication may include the long/short format indication of the PRACH resource, and the short/long format indication of the PRACH resource is used to indicate whether a conflicting PRACH resource is in a long format or a short format. Optionally, the first indication may include long/short format indications of the PRACH resource of the BFR, the PRACH resource of the OSI, the PRACH resource of the uplink carrier, the PRACH resource of the normal uplink carrier, the PRACH resource of the supplementary uplink carrier, and the common PRACH resource.

Optionally, the first indication may include the candidate resource list of the PRACH resource, and the list includes a candidate PRACH resource used by the second access device, so that the second access device selects a proper PRACH resource from one or more candidate PRACH resources, thereby avoiding the PRACH resource conflict.

204: The second access device performs processing according to the first indication.

In a possible manner, if the first indication includes the PRACH resource conflict indication, the second access device modifies a PRACH resource according to the first indication. If the first indication includes the PRACH resource conflict type, the second access device modifies a PRACH resource of a corresponding type according to the first indication. If the first indication includes the long/short format indication of the PRACH resource, the second access device modifies a corresponding PRACH resource according to the long/short format indication. If the first indication includes the candidate resource list of the PRACH resource, the second access device selects a proper PRACH resource from the candidate resource list as a new PRACH resource configuration according to the first indication.

Optionally, the second access device sends, to the first access device, the new PRACH resource configuration obtained through modification. Optionally, the new PRACH resource configuration obtained through modification may be sent through an interface message exchanged between the first access device and the second access device. The interface message may be an existing Xn interface message, or may be a new Xn interface message, for example, a PRACH optimization request response message. This is not limited herein in this application.

Optionally, in a possible manner, the candidate resource list, included in the first indication, of the PRACH resource may carry only one specific PRACH resource. To be specific, the second access device is indicated to modify a currently used PRACH resource to the specific PRACH resource.

Optionally, the first access device may alternatively send a first indication to the OAM, where the first indication is used to indicate a PRACH resource conflict, and the OAM performs processing according to the first indication, in other words, the OAM optimizes the PRACH resource configuration. For a specific process in which the OAM performs processing according to the first indication, refer to the process in which the second access device performs processing according to the first indication. Details are not described again. For example, if the OAM modifies a PRACH resource configuration according to the first indication, the OAM sends, to the first access device, the new PRACH resource configuration obtained through modification.

Further, optionally, the second access device may alternatively send a first indication to the OAM, and the OAM performs processing according to the first indication. For a specific process in which the OAM performs processing according to the first indication, refer to the foregoing process in which the second access device performs processing according to the first indication. Details are not described again. For example, if the OAM modifies a PRACH resource according to the first indication, the OAM sends, to the second access device, the new PRACH resource obtained through modification.

In this embodiment of this application, the first access device receives the first information sent by the second access device, where the first information includes the at least one of the PRACH resource information of the beam failure recovery BFR, the PRACH resource information of the on-demand system information OSI, and the PRACH resource information of the uplink UL carrier, and optimizes the random access channel RACH based on the first information, thereby avoiding a conflict between at least one of the BFR-specific PRACH resources, the OSI-specific PRACH resources, and the uplink UL carrier—specific PRACH resources of the first access device and the second access device.

Embodiment 2

Figure 3:
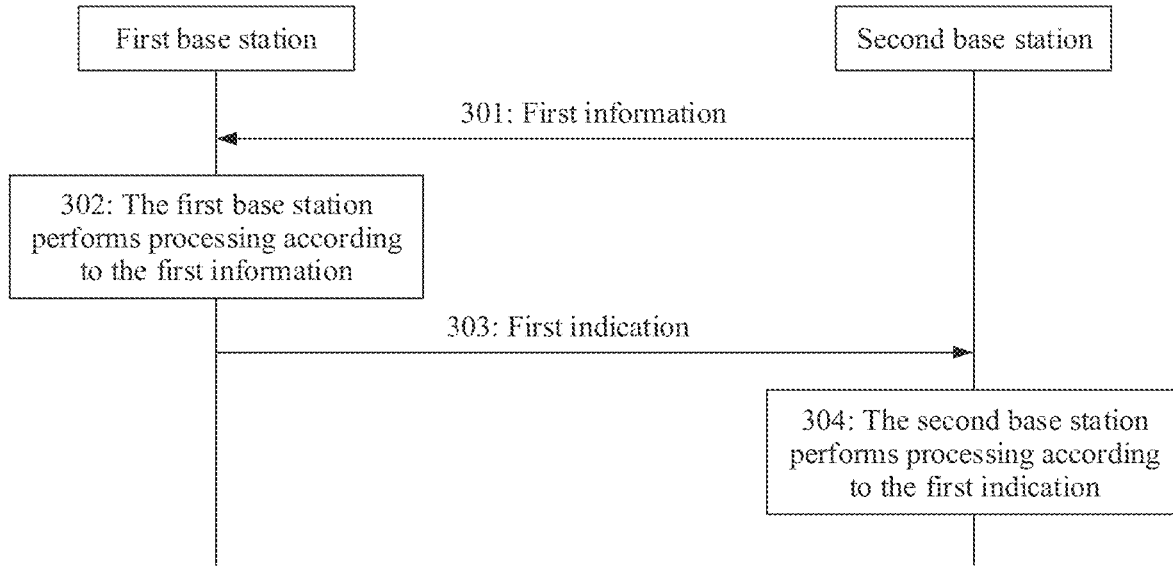
FIG. 3 is a schematic diagram of another embodiment of a physical random access channel PRACH resource processing method according to an embodiment of this application.

For ease of understanding, the following uses a specific application scenario as an example for description. A first access device is a first base station, and a second access device is a second base station. Referring to FIG. 3, another embodiment of the PRACH resource processing method in the embodiments of this application includes the following steps.

301: The second base station sends first information to the first base station.

Herein, for a specific process in which the second access device sends the first information to the first access device and content of the first information, refer to step 201 in Embodiment 1. Details are not described herein again.

For example, a format of an information element of the foregoing PRACH resource information transferred through an Xn interface message is shown in the following table:

In Table 1, a common PRACH resource Rootsequenceindex and a PRACH resource of BFR Rootsequenceindex-BFR are arranged separately. Alternatively, as shown in Table 2, a common PRACH resource Rootsequenceindex and a PRACH resource of BFR Rootsequenceindex-BFR are arranged in a lower-level attribute of RootSequenceIndexlist. Similarly, the common PRACH resource Rootsequenceindex, the PRACH resource of the BFR Rootsequenceindex-BFR, and a PRACH resource of OSI Rootsequenceindex-OSI may all be arranged in the lower-level attribute of RootSequenceIndexlist.

It should be noted that an example in which common PRACH resource configuration information and PRACH resource configuration information of the BFR are included is used for description in Table 1, and the table may further include PRACH resource information of the OSI. This is not specifically limited herein.

TABLE 1

| Information element (IE)/Group name (Group Name) |
| --- |
| RootSequenceIndex |
| Rootsequenceindex-BFR |
| ZeroCorrelationZoneConfiguration |

TABLE 1-continued

| Information element (IE)/Group name (Group Name) |
| --- |
| ZeroCorrelationZoneConfiguration-BFR |
| HighSpeedFlag |
| HighSpeedFlag-BFR |
| PRACH-FrequencyOffset |
| PRACH-FrequencyOffset-BFR |
| PRACH-ConfigurationIndex |
| PRACH-ConfigurationIndex-BFR |

TABLE 2

| Information element (IE)/Group name (Group Name) |
| --- |
| RootSequenceIndexlist |
| >Rootsequenceindex |
| >Rootsequenceindex-BFR |
| ZeroCorrelationZoneConfiguration |
| >ZeroCorrelationZoneConfiguration |
| >ZeroCorrelationZoneConfiguration-BFR |
| HighSpeedFlag |
| >HighSpeedFlag |
| >HighSpeedFlag-BFR |
| PRACH-FrequencyOffset |
| >PRACH-FrequencyOffset |
| >PRACH-FrequencyOffset-BFR |
| PRACH-ConfigurationIndex |
| >PRACH-ConfigurationIndex |
| >PRACH-ConfigurationIndex-BFR |

It should be noted that Table 2 is merely an example for description, and the table may further include the PRACH resource configuration information of the OSI and/or PRACH resource information of an uplink UL carrier. The PRACH resource information of the uplink UL carrier includes PRACH resource information of a normal uplink carrier and/or PRACH resource information of a supplementary uplink carrier. The foregoing information element may be optional, or may be mandatory. This is not specifically limited herein.

The information element (parameter) in the foregoing table may be specifically an information element of a cell. Therefore, correspondingly, there is further information such as a cell identity. For example, the information element may be included in cell information of a base station, or may be an independent information element. Alternatively, the information elements may be separately transmitted through a non UE-associated signaling message or a UE-associated signaling message. This is not limited in this embodiment of this application. The foregoing table may further include a long/short format indication of a PRACH resource, and details are not described herein again. It should be noted that, the PRACH resource information of the BFR may be exchanged in a user equipment specific (UE specific) message. For example, the PRACH resource information of the BFR is exchanged in a handover (HO) message.

Optionally, the first base station and the second base station exchange messages through an Xn interface. An Xn interface message may be an existing Xn interface message, including a user equipment—associated (UE-associated) signaling message and a non user equipment—associated (non UE-associated) message, or may be a newly defined Xn interface message. This is not limited herein in this application. For example, the PRACH resource information of the BFR may be exchanged in the UE specific message, for example, the handover message.

302: The first base station performs processing based on the first information.

The first base station uses the received first information to optimize a random access channel RACH. Specifically, the optimization of the random access channel RACH shown in this application may be PRACH resource optimization. More specifically, the first base station optimizes a PRACH resource configuration based on the first information sent by the second base station. The first base station determines whether a first PRACH resource configuration of the first base station conflicts with a second PRACH resource configuration of the second base station. If the first PRACH resource configuration of the first base station conflicts with the second PRACH resource configuration of the second base station, the first base station may modify the first PRACH resource configuration of the first base station to a new PRACH resource configuration, that is, an optimized first PRACH resource configuration, where the optimized first PRACH resource configuration does not conflict with the second PRACH resource configuration of the second base station. Alternatively, the first base station indicates the second base station to modify the second PRACH resource configuration of the second base station to a new PRACH resource configuration, that is, an optimized second PRACH resource configuration, where the optimized second PRACH resource configuration does not conflict with the first PRACH resource configuration of the first base station. If the first base station modifies the first PRACH resource configuration of the first base station, the optimization process ends. For a specific process, refer to step 202 in Embodiment 1. Details are not described herein again.

Optionally, if the first base station does not modify the first PRACH resource configuration of the first base station, the first base station may perform the following process:

For example, the first base station may send a first indication to OAM, and the OAM optimizes the random access channel RACH according to the first indication.

For another example, the first base station sends the first indication to the second base station, and after the second base station receives the first indication, the second base station sends the first indication to the OAM, so that the OAM may optimize the random access channel RACH for the second base station according to the first indication. For a specific process of optimizing the PRACH resource configuration, refer to the following step 303 and step 304. Details are not described herein.

For another example, the first base station may obtain PRACH resource information of a neighboring cell and/or a neighboring degree, so that the first base station optimizes the PRACH resource configuration according to indications for the PRACH resource information of the neighboring cell and the neighboring degree, or the first base station may send indications for the PRACH resource information of the neighboring cell and the neighboring degree to the OAM, and the OAM optimizes the PRACH resource configuration. Specifically, the neighboring degree may be one or more of direct neighboring, indirect neighboring, and a specific distance, and the neighboring degree may be identified by using 0, 1, 2, or the like (where 0 represents the direct neighboring, 1 represents the indirect neighboring, and 2 represents the specific distance). Alternatively, the neighboring degree may be represented in another manner. This is not limited herein in this application.

For another example, the first base station may perform processes shown in the following step 303 and step 304. Details are shown as follows.

303: The first base station sends the first indication to the second base station, where the first indication is used to indicate the second base station to optimize the random access channel RACH.

The first base station sends the first indication to the second base station, where the first indication is used to indicate the second base station to optimize the random access channel RACH. The first indication may include a PRACH resource conflict indication. When the first base station obtains a PRACH resource conflict result based on the second PRACH resource configuration of the second base station carried in the received first information, the first base station needs to send the first indication to the second base station, where the first indication includes the PRACH resource conflict indication, and the PRACH resource conflict indication is used to indicate that a first PRACH resource of the first base station conflicts with a second PRACH resource of the second base station.

It may be understood that the first indication may further include a PRACH resource conflict type, and the PRACH resource conflict type includes at least one of a common PRACH resource conflict, a PRACH resource conflict of the BFR, a PRACH resource conflict of the OSI, a PRACH resource conflict of the uplink carrier, a PRACH resource conflict of the normal uplink carrier, and a PRACH resource conflict of the supplementary uplink carrier. For example, if the first indication includes the PRACH resource conflict of the BFR, after receiving the first indication, the second base station needs to modify a BFR PRACH resource configuration of the second base station. The first indication may further include the long/short format indication of the PRACH resource, a candidate resource list of the PRACH resource, and the like. For a specific process, refer to step 203 in Embodiment 1. Details are not described herein again.

304: The second base station performs processing according to the first indication.

In a possible manner, the second base station modifies the PRACH resource of the second base station according to the first indication. If the first indication carries the candidate resource list, the second base station may directly select a proper PRACH resource from the candidate resource list as a new PRACH resource configuration. For a specific process, refer to step 204 in Embodiment 1. Details are not described herein again.

It should be noted that, after modifying the second PRACH resource configuration of the second base station, the second base station may further send a modification result to the first base station.

It should be noted that the PRACH resource information described in this embodiment may be PRACH resource information of each cell served by the base station.

In this embodiment of this application, the first base station receives the first information sent by the second base station, where the first information includes at least one of the PRACH resource information of the beam failure recovery BFR, the PRACH resource information of the on-demand system information OSI, and the PRACH resource information of the uplink carrier, and optimizes the random access channel RACH by using the first information, thereby avoiding a conflict between at least one of BFR-specific PRACH resources, OSI-specific PRACH resources, and uplink UL carrier—specific PRACH resources of the first base station and the second base station.

Embodiment 3

Figure 4:
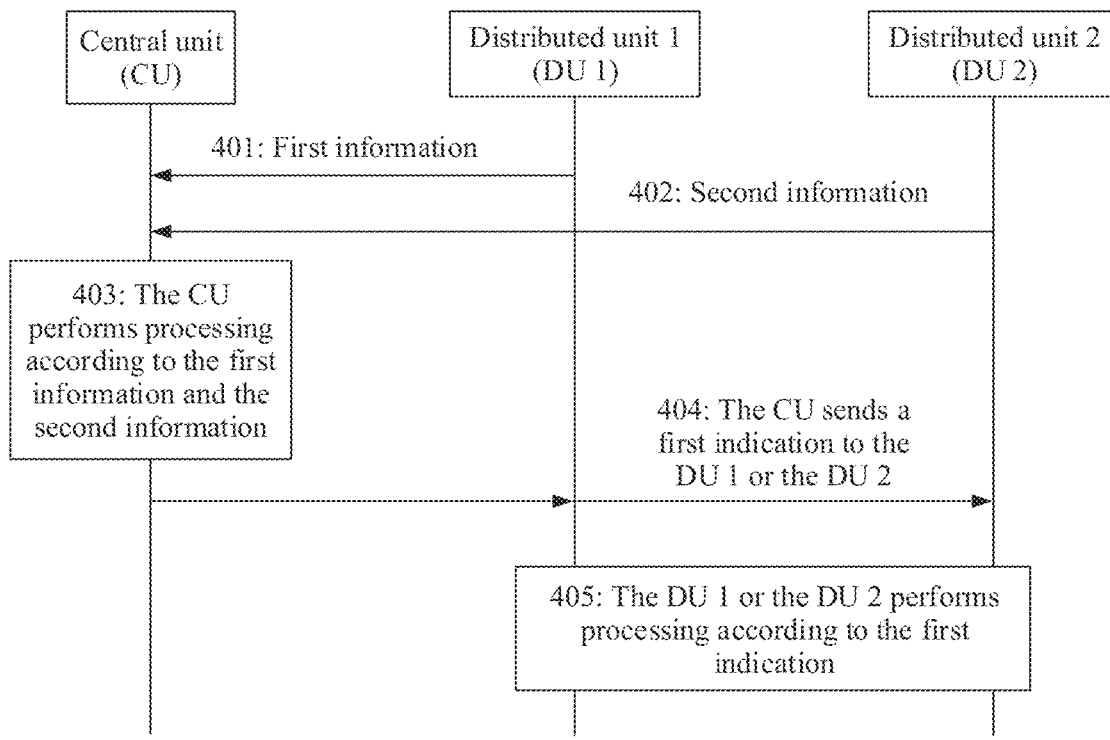
FIG. 4 is a schematic diagram of another embodiment of a physical random access channel PRACH resource processing method according to an embodiment of this application.

In an NR CU-DU architecture, that is, a first access device is a gNB-CU, which is simply referred to as a CU, and a second access device is a gNB-DU, which is simply referred to as a DU, when one CU supports a plurality of DUs, that is, in an intra CU scenario, an example in which one CU includes two DUs (a DU 1 and a DU 2) is used for description in this embodiment of this application. Referring to FIG. 4, another embodiment of the PRACH resource processing method in the embodiments of this application includes the following steps.

401: The DU 1 sends first information to the CU.

The DU 1 sends the first information to the CU, where the first information includes at least one of common PRACH resource information, PRACH resource information of BFR, PRACH resource information of OSI, and PRACH resource information of an uplink carrier. The PRACH resource information of the uplink carrier includes PRACH resource information of a normal uplink carrier and/or PRACH resource information of a supplementary uplink carrier. The common PRACH resource information may be understood as PRACH resource information universal for each cell served by the DU 1.

It should be noted that the first information may be carried in an interface message transmitted between the CU and a DU for sending. The interface message may be an F1 interface message. The F1 interface message may be an existing F1 interface message, including a UE-associated signaling message and a non UE-associated message, or may be a newly defined F1 interface message. This is not limited herein in this embodiment of this application. For example, the first information is included in an F1 setup request message/response message, an F1 setup request message, a base station configuration update message, or a base station configuration update response message, for example, is included in cell information in the message.

Content of the first information sent by the DU 1 to the CU and a process in which the DU 1 sends the first information to the CU are similar to step 201, and details are not described herein again.

402: The DU 2 sends second information to the CU.

The DU 2 sends the second information to the CU. A parameter carried in the second information sent by the DU 2 is the same as a parameter carried in the first information sent by the DU 1. For example, when the first information sent by the DU 1 includes the PRACH resource information of the BFR of the DU 1, the second information sent by the DU 2 also includes PRACH resource information of BFR of the DU 2.

Content of the second information sent by the DU 2 to the CU and a process in which the DU 2 sends the second information to the CU are similar to step 201, and details are not described herein again.

It may be understood that, in this application, a format of the second information sent by the DU 2 is the same as a format of the first information sent by the DU 1. For example, the first information sent by the DU 1 indicates a PRACH resource of the BFR, and the second information sent by the DU 2 indicates a PRACH resource of the BFR. In this case, it may be considered that each of the first information and the second information indicates the PRACH resource of the BFR, that is, information of a same type needs to be sent. Therefore, to facilitate identification of the CU, formats for indicating the resource of the BFR are the same, that is, formats are the same. The first information and the second information herein are merely used to distinguish whether an information sender is the DU 1 or the DU 2, the first information indicates that the sender is the DU 1, and the second information indicates that the sender is the DU 2.

It should be noted that there is no specific sequence between step 401 and step 402, and step 401 and step 402 may be simultaneously performed, or may be successively performed. For example, step 401 is performed before step 402. Alternatively, step 402 is performed before step 401.

Alternatively, step 401 and step 402 are simultaneously performed. This is not specifically limited herein.

403: The CU performs processing based on the first information and the second information.

Specifically, the CU uses the first information and the second information to optimize a random access channel RACH. It may be understood that, that the CU uses the first information and the second information to optimize a random access channel (RACH) of the DU 1 and a random access channel (RACH) of the DU 2 may be specifically to optimize a PRACH resource configuration of the DU 1 and a PRACH resource configuration of the DU 2.

For example, the CU may separately perform random access channel RACH optimization on a PRACH resource of the DU 1 and a PRACH resource of the DU 2 based on the first information and the second information.

For another example, the CU may obtain PRACH resource information of a neighboring cell and/or a neighboring degree, so that the CU optimizes the PRACH resource configuration according to indications for the PRACH resource information of the neighboring cell and the neighboring degree, or the CU may send indications for the PRACH resource information of the neighboring cell and the neighboring degree to OAM, and the OAM optimizes the PRACH resource configuration. Specifically, the neighboring degree may be one or more of direct neighboring, indirect neighboring, and a specific distance, and the neighboring degree may be identified by using 0, 1, 2, or the like (where 0 represents the direct neighboring, 1 represents the indirect neighboring, and 2 represents the specific distance). Alternatively, the neighboring degree may be represented in another manner. This is not limited herein in this application.

404: The CU sends a first indication to the DU 1 or the DU 2, where the first indication is used to indicate the DU 1 or the DU 2 to optimize the random access channel RACH.

Specifically, the first indication may include a PRACH resource conflict type, and the PRACH resource conflict type includes at least one of a common PRACH resource conflict, a PRACH resource conflict of the BFR, a PRACH resource conflict of the OSI, and a PRACH resource conflict of the uplink carrier. The PRACH resource conflict of the uplink carrier includes a PRACH resource conflict of the normal uplink carrier and/or a PRACH resource conflict of the supplementary uplink carrier.

For example, if the first indication includes the PRACH resource conflict of the BFR, the CU may send, to the DU 1, the first indication including the PRACH resource conflict of the BFR. After receiving the first indication, the DU 1 needs to optimize a PRACH resource configuration of the BFR of the DU 1.

For example, if the CU finds a PRACH resource of the DU 1 conflicts with a PRACH resource of the DU 2, the CU determines a PRACH resource of a specific DU that needs to be modified. For example, if the CU selects the DU 2 to modify a PRACH resource, the CU sends the first indication to the DU 2. After receiving the first indication, the DU 2 modifies a PRACH resource configuration of the DU 2. Specific content and a sending process of the first indication are similar to step 203 in the foregoing embodiment, and details are not described herein again.

Optionally, when the CU serves a plurality of DUs (that is, three or more DUs), if the CU finds a PRACH resource conflict among the plurality of DUs, for example, if the CU serves four DUs and a PRACH resource conflict occurs among a DU 1, a DU 2, and a DU 3, the CU may allocate non-conflicting PRACH resources to two DUs (for example, the DU 1 and the DU 2) that conflict with each other, and the CU separately sends a non-conflicting PRACH resource to the DU 1 and the DU 2.

Optionally, the CU may not send the first indication to the DU 1 or the DU 2. It may be understood that the CU does not optimize the random access channel RACH, but the CU sends the first indication to the OAM, and the OAM optimizes the random access channel RACH, that is, optimizes the PRACH resource configuration.

For example, the CU may send the first indication to the OAM, and the OAM optimizes the random access channel RACH according to the first indication.

It should be noted that the PRACH resource of each DU described above may be a PRACH resource of a cell served by the DU. Interaction and conflict indication may be performed on a common PRACH resource through an F1 setup message and a configuration update message, and interaction and conflict indication may be performed on the PRACH resource of the BFR through a UE specific message, for example, a bearer setup message.

405: The DU 1 or the DU 2 performs processing according to the first indication.

A specific process herein is similar to step 204 in Embodiment 1, and details are not described herein again.

In this embodiment of this application, the CU receives the first information sent by the DU 1 and the second information sent by the DU 2, where the first information includes the at least one of the PRACH resource information of the beam failure recovery BFR, the PRACH resource information of the on-demand system information OSI, and the PRACH resource information of the uplink UL carrier, and the second information is the same as the first information. The CU optimizes the random access channel RACH based on the first information and the second information, thereby avoiding a conflict between at least one of BFR-specific PRACH resources, OSI-specific PRACH resources, and uplink UL carrier—specific PRACH resources of the CU and each DU.

Optionally, after the DU 1 or the DU 2 receives the first indication, the DU (the DU 1 or the DU 2) that has received the first indication sends the first indication to the OAM, and the OAM optimizes the random access channel RACH. That the OAM optimizes the random access channel RACH belongs to a specific implementation, and details are not described in this embodiment.

Further, optionally, after the DU 1 or the DU 2 receives the first indication, the DU that has received the first indication sends, to the OAM, information used to indicate the OAM to optimize the random access channel RACH. A specific format of the information is not limited in this embodiment provided that the OAM can optimize the random access channel RACH based on the information.

It should be noted that the PRACH resource information described in this embodiment may be PRACH resource information of each cell served by the DU, or may be PRACH resource information of each cell served by the CU.

Embodiment 4

Figure 5:
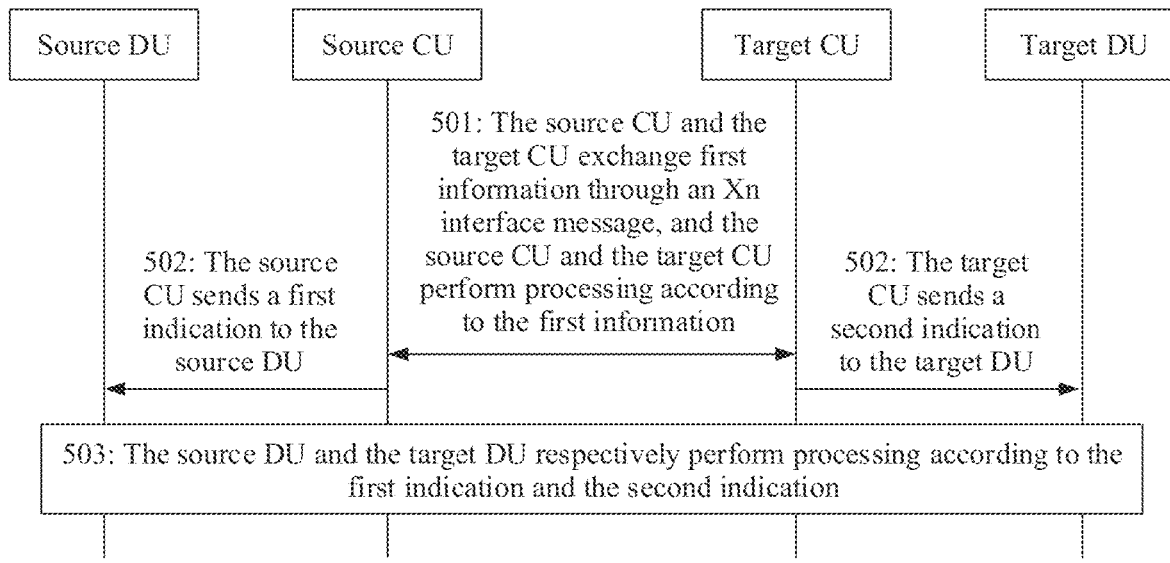
FIG. 5 is a schematic diagram of another embodiment of a physical random access channel PRACH resource processing method according to an embodiment of this application.

When the PRACH resource processing method is used in another scenario, a specific process is similar. In an NR CU-DU architecture, that is, a first access device is a gNB-CU, which is simply referred to as a CU, and a second access device is a gNB-DU, which is simply referred to as a DU, when there are a plurality of CUs, and different CUs each support a plurality of DUs, that is, in an inter CU scenario, a case in which there are two CUs (a source CU and a target CU), the source CU is connected to one source DU, and the target CU is connected to one target DU is used as an example for description in the following. Referring to FIG. 5, another embodiment of the PRACH resource processing method in the embodiments of this application includes the following steps.

Scenario 1: A connection is first set up between the source CU and the target CU, and then a respective DU is added to each CU. To be specific, the CUs directly first set up an Xn interface connection, and then an F1 interface is set up between a CU and a respective corresponding DU. Details are as follows.

501: The source CU and the target CU exchange first information through an Xn interface message, and the source CU and the target CU perform processing based on the first information.

Specifically, the source CU sends PRACH resource information of the source CU to the target CU through an Xn interface message, the target CU sends PRACH resource information of the target CU to the source CU through an Xn interface message, and the source CU or the target CU optimizes a random access channel RACH by using the obtained PRACH resource information. A process of sending the first information through the Xn interface message and optimizing the random access channel RACH by using the first information is the same as that described in step 201 and step 202 in Embodiment 1, and details are not described herein again.

502: The source CU sends a first indication to the source DU, and the target CU sends a second indication to the target DU, where the first indication is used to indicate the source DU to optimize the random access channel RACH, and the second indication is used to indicate the target DU to optimize the random access channel RACH.

Content and sending processes of the first indication and the second indication are similar to step 203 in Embodiment 1, and details are not described herein again. The first indication and the second indication may be simultaneously sent, or may not be simultaneously sent, or only one of the first indication and the second indication may be sent. This is not limited herein in this embodiment of this application.

It may be understood that, in this application, a format of the first indication sent by the source CU is the same as a format of the second indication sent by the target CU. The first indication and the second indication herein are merely used to distinguish whether an information sender is the source CU or the target CU, the first indication indicates that the sender is the source CU, and the second indication indicates that the sender is the target CU.

Specifically, before this step, an F1 interface is set up between the source CU and the source DU, and an F1 interface is set up between the target CU and the target DU. Both the first indication and the second indication are sent through an F1 interface message, and the F1 interface message may be an existing F1 interface message, or may be a newly defined F1 interface message. This is not limited herein in this application.

For example, the source CU determines a first available PRACH resource for the source DU, and the target CU determines a second available PRACH resource for the target DU. The first available PRACH resource and the second available PRACH resource each may be a specific PRACH resource, or each may be a candidate list of a PRACH resource. This is not limited herein in this application. It may be understood that, processes of setting up respective F1 interfaces by the source CU and the target CU may be simultaneously performed, or may be successively performed. For example, the F1 interface of the source CU is first set up, and then the F1 interface of the target CU is set up; the F1 interface of the target CU is first set up, and then the F1 interface of the source CU is set up; or the F1 interface of the source CU and the F1 interface of the target CU may be simultaneously set up. This is not limited herein.

503: The source DU and the target DU respectively perform processing according to the first indication and the second indication.

The processing process is similar to step 204 in Embodiment 1, and details are not described herein again.

An example in which the first indication and the second indication each are the candidate resource list of the PRACH resource is used for description.

The source CU sends the first available PRACH resource to the source DU through an F1 interface message. The target CU sends the second available PRACH resource to the target DU through an F1 interface message. After receiving the first available PRACH resource sent by the source CU, the source DU selects a proper first PRACH resource. After receiving the second available PRACH resource sent by the target CU, the target DU selects a proper second PRACH resource.

Optionally, the source DU sends the first PRACH resource to the source CU, so that the source CU learns of the PRACH resource selected by the source DU. Specifically, the first PRACH resource may be sent by the source DU to the source CU through an F1 interface message.

Optionally, the target DU sends the second PRACH resource to the target CU, so that the target CU learns of the PRACH resource selected by the target DU. Specifically, the second PRACH resource may be sent by the target DU to the target CU through an F1 interface message.

Further, optionally, if the source DU or the target DU actively modifies PRACH resource information, the source DU and the target DU need to send modified PRACH resource information to the source CU and the target CU. Specifically, the modified PRACH resource information may be sent by the source DU and the target DU to the source CU and the target CU through an F1 interface message, and the source CU and the target CU may further optimize the random access channel RACH.

It should be noted that the F1 interface message may be an existing F1 interface message, or may be a newly defined F1 interface message. This is not limited herein in this embodiment of this application.

Figure 6:
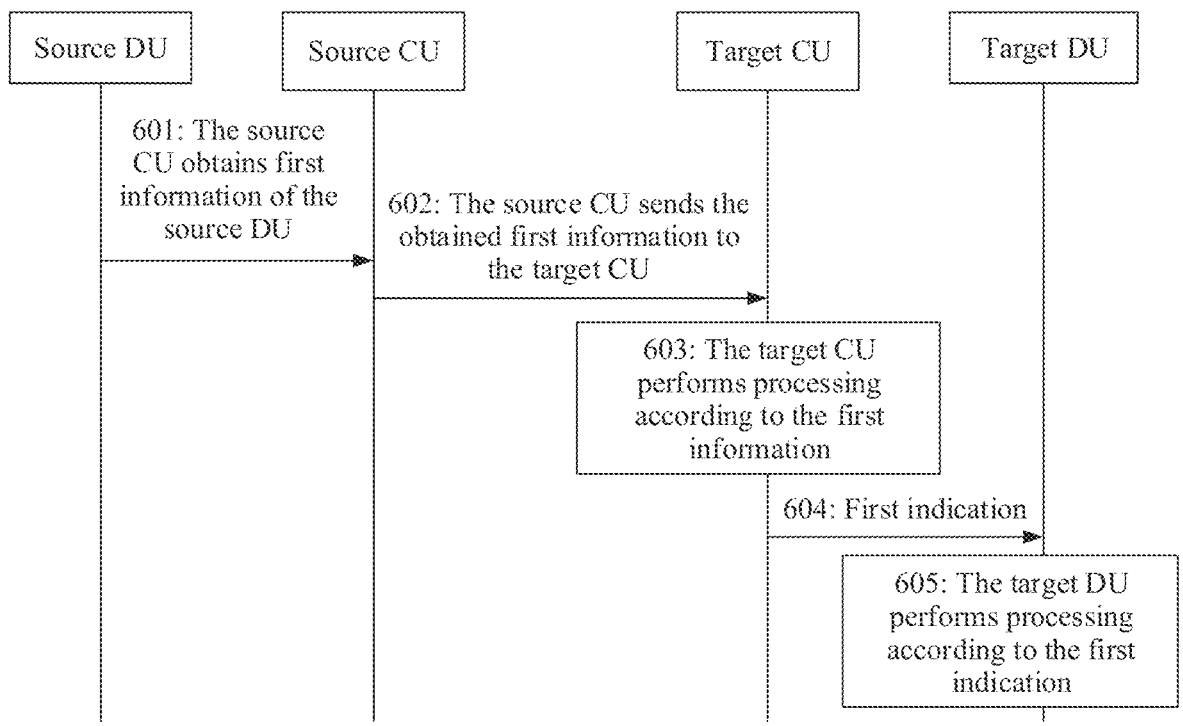
FIG. 6 is a schematic diagram of another embodiment of a physical random access channel PRACH resource processing method according to an embodiment of this application.

Scenario 2: The source CU first sets up an F1 interface to the source DU, the source CU sets up an Xn interface connection to the target CU, and then the target CU sets up an F1 interface to the target DU. Referring to FIG. 6, another embodiment of the PRACH resource processing method in the embodiments of this application includes the following steps.

601: The source CU obtains first information of the source DU.

Content and a transmission process of the first information are similar to step 201 in Embodiment 1, and details are not described herein again.

It should be noted that the source CU and the source DU exchange the first information through an F1 interface message.

602: The source CU sends the obtained first information to the target CU.

Content and a transmission process of the first information are similar to step 201 in Embodiment 1, and details are not described herein again.

603: The target CU performs processing based on the first information.

Specifically, the target CU uses the received first information to optimize a random access channel RACH. It may be understood that after coordinating PRACH resource information, the target CU allocates a non-conflicting PRACH resource to the target DU.

Optionally, the target CU allocates a PRACH resource candidate set to the target DU, and the target DU selects a PRACH resource. Optionally, if the target CU has obtained a PRACH resource of the target DU from an F1 interface setup message, the target CU coordinates the PRACH resource with a PRACH resource, obtained through an Xn interface, of the source CU and reallocates a new PRACH resource to the target DU, and the new PRACH resource does not conflict with the PRACH resource of the source CU.

604: The target CU sends a first indication to the target DU, where the first indication is used to indicate the target DU to optimize the random access channel RACH.

Content and a transmission process of the first indication are similar to step 203 in Embodiment 1, and details are not described herein again.

605: The target DU performs processing according to the first indication.

A specific processing process is similar to step 204 in Embodiment 1, and details are not described herein again.

Optionally, after modifying a PRACH resource to a new PRACH resource according to the first indication, the target DU may send the new PRACH resource to the source CU through the target CU. Further, optionally, the source CU may send the new PRACH resource to the source DU.

Figure 7:
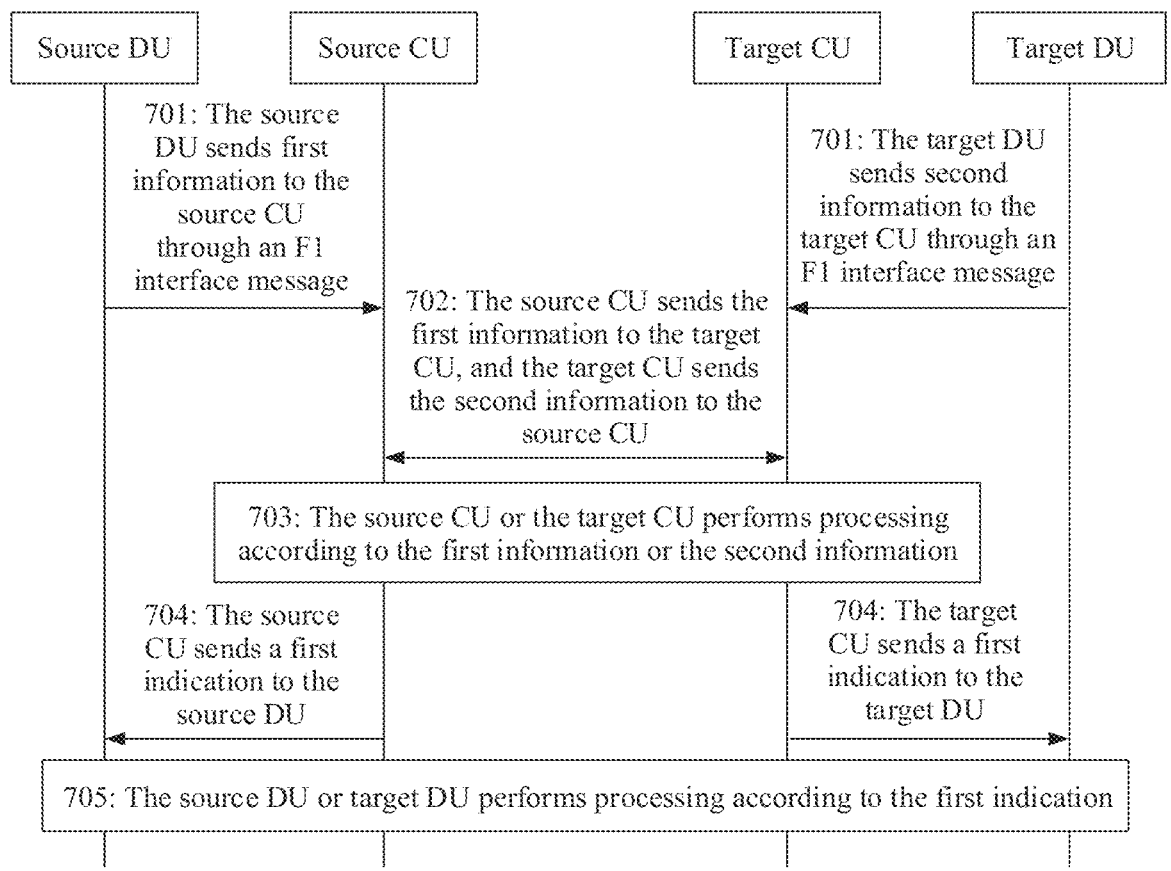
FIG. 7 is a schematic diagram of another embodiment of a physical random access channel PRACH resource processing method according to an embodiment of this application.

Scenario 3: The source CU and the target CU have set up F1 interfaces to respective DUs, and then an Xn interface connection is set up between the source CU and the target CU. Referring to FIG. 7, another embodiment of the PRACH resource processing method in the embodiments of this application includes the following steps.

701: The source DU sends first information to the source CU through an F1 interface message, and the target DU sends second information to the target CU through an F1 interface message.

Content and specific sending processes of the first information and the second information are similar to step 201 in Embodiment 1, and details are not described herein again.

It may be understood that, in this application, a content format of the first information sent by the source DU is the same as a content format of the second information sent by the target DU. The first information and the second information herein are merely used to distinguish whether an information sender is the source DU or the target DU, the first information indicates that the sender is the source DU, and the second information indicates that the sender is the target DU.

It may be understood that a process in which the source DU sends the first information to the source CU and a process in which the target DU sends the second information to the target CU may be simultaneously performed, or may be successively performed, or may be separately performed. This is not limited herein in this application.

702: The source CU sends the first information to the target CU, and the target CU sends the second information to the source CU.

Content and specific sending processes of the first information and the second information are similar to step 201 and step 202 in Embodiment 1, and details are not described herein again.

It may be understood that a process in which the source CU sends the first information to the target CU and a process in which the target CU sends the second information to the source CU may be simultaneously performed, or may be successively performed, or may be separately performed. This is not limited herein in this application.

703: The source CU or the target CU performs processing based on the first information or the second information.

Specifically, the source CU or the target CU uses the received first information or the received second information to optimize a random access channel RACH. It may be understood that, the source CU or the target CU uses the received first information or the received second information to optimize the random access channel RACH.

A specific processing process is similar to step 202 in Embodiment 1, and details are not described herein again.

704: The source CU sends a first indication to the source DU, or the target CU sends a first indication to the target DU.

Specific content and a sending process of the first indication are similar to step 203 in Embodiment 1, and details are not described herein again.

It should be noted that the first indication is sent through an F1 interface message. The F1 interface message may be an existing F1 interface message, or may be a newly defined message. This is not limited herein in this application.

705: The source DU or the target DU performs processing according to the first indication.

A specific processing process is similar to step 204 in Embodiment 1, and details are not described herein again.

For example, if finding a PRACH resource conflict, the source CU sends a conflict indication to the source DU, or allocates a new PRACH resource to the source DU. Alternatively, if finding a PRACH resource conflict, the target CU sends a conflict indication to the target DU, or allocates a new PRACH resource to the target DU. A specific process is similar to step 204 in Embodiment 1, and details are not described herein again.

In this embodiment of this application, for different application scenarios, the source CU receives the first information sent by the source DU, the target CU receives the second information sent by the target DU, where the first information and the second information each include at least one of PRACH resource information of beam failure recovery BFR, PRACH resource information of on-demand system information OSI, and PRACH resource information of an uplink carrier, and the source CU and the target CU optimize the random access channel RACH based on the first information and the second information, thereby avoiding a conflict between at least one of BFR-specific PRACH resources, OSI-specific PRACH resources, and uplink UL carrier—specific PRACH resources of the target CU/the source DU and the source CU.

It should be noted that the PRACH resource information described in all the embodiments of this application may be PRACH resource information of each cell served by a DU, or may be PRACH resource information of each cell served by a CU.

It should be noted that this embodiment is further applicable to a data transmission scenario in an LTE CU-DU architecture, and details are not described herein.

In this application, an F1 interface message or a V1 interface message (an F1AP message or a V1AP message) may be used for interaction between the CU and the DU. For example, an existing F1AP message may be a gNB-CU/gNB-DU configuration update message, a gNB-CU/gNB-DU configuration update acknowledge message, a UE context setup/modification request (user equipment context setup/modification request) message, a UE context setup/modification response (user equipment context setup/modification response) message, a UE context setup/modification required (user equipment context setup/modification required) message, or a UE context release command/request/complete message.

Figure 8:
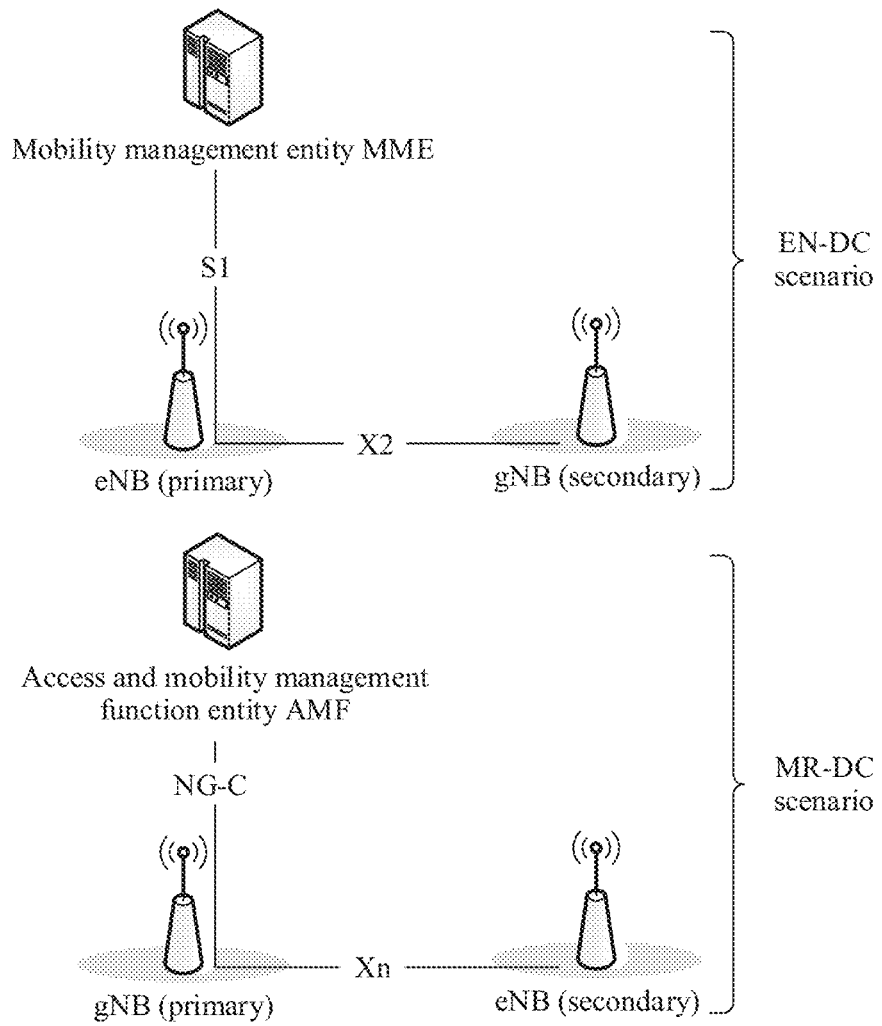
FIG. 8 is a schematic diagram of another network architecture to which an embodiment of this application is applicable.

Embodiment 3 and Embodiment 4 describe an NR CU-DU scenario. When the PRACH resource processing method is used in an EN-DC scenario and an MR-DC scenario, the EN-DC scenario and the MR-DC scenario are shown in FIG. 8. A specific process is similar to that in the foregoing CU-DU scenario. The EN-DC scenario further includes an intra MN scenario and an inter MN scenario. The intra MN scenario includes one master node (MN), and the MN supports a plurality of secondary nodes (SN). The inter MN scenario includes a plurality of MNs, there is an interface between various MNs, and each MN may further exchange information with one or more SNs supported by the MN.

The EN-DC scenario is used as an example for description. When one MN and one SN are included, specific steps are as follows.

Step 1: The secondary node sends first information to the master node.

Content and a sending process of the first information are similar to step 301, and details are not described herein again.

Step 2: The master node performs processing based on the first information.

A specific processing process is similar to step 302, and details are not described herein again.

Step 3: The master node sends a first indication to the secondary node, where the first indication is used to indicate the secondary node to optimize a random access channel RACH.

Specific content and a sending process of the first indication are similar to step 303 in the foregoing embodiment, and details are not described herein again.

Step 4: The secondary node performs processing according to the first indication.

A specific processing process is similar to step 304, and details are not described herein again.

An intra MN scenario of EN-DC is used as an example for description. When an MN is included, where the MN corresponds to an SN 1 and an SN 2, specific steps are as follows.

Step 1: The SN 1 sends first information to the MN.

Content and a sending process of the first information are similar to step 401, and details are not described herein again.

Step 2: The SN 2 sends second information to the MN.

Content and a sending process of the second information are similar to step 402, and details are not described herein again.

Step 3: The MN performs processing based on the first information and the second information.

A specific processing process is similar to step 403, and details are not described herein again.

Step 4: The MN sends a first indication to the SN 1 or the SN 2, where the first indication is used to indicate the SN 1 or the SN 2 to optimize a random access channel RACH.

Specific content and a sending process of the first indication are similar to step 404 in the foregoing embodiment, and details are not described herein again.

Step 5: The SN 1 or the SN 2 performs processing according to the first indication.

A specific processing process is similar to step 405, and details are not described herein again.

An inter MN scenario of EN-DC is used as an example for description. When an MN 1 and an MN 2 are included, where the MN 1 corresponds to an SN 1, and the MN 2 corresponds to an SN 2, specific steps are as follows.

Step 1: The MN 1 and the MN 2 exchange first information through an Xn interface message, and the MN 1 and the MN 2 perform processing based on the first information.

A specific processing process is similar to step 501, and details are not described herein again.

Step 2: An X2/Xn interface is set up between the MN 1 and the SN 1, and an X2/Xn interface is set up between the MN 2 and the SN 2.

Step 3: The MN 1 sends a first available PRACH resource to the SN 1 through an X2/Xn interface message.

Content and a sending process of the first available PRACH resource are similar to step 503, and details are not described herein again.

Step 4: The MN 2 sends a second available PRACH resource to the SN 2 through an X2/Xn interface message.

Content and a sending process of the second available PRACH resource are similar to step 503, and details are not described herein again.

Step 5: After receiving the first available PRACH resource, the SN 1 selects a proper PRACH resource, and after receiving the second available PRACH resource, the SN 2 selects a proper PRACH resource.

A specific selection process is similar to step 505, and details are not described herein again.

Different from the CU-DU architecture, an interface between an MN and an SN is an X2 interface or an Xn interface of EN-DC. Another scenario is similar, and details are not described herein. It should be noted that, interaction and conflict indication may be performed on a common PRACH resource through an EN-DC X2 setup message, and interaction and conflict indication may be performed on a PRACH resource of BFR through an SN addition/modification message.

The solution provided in this application may be further used in the MR-DC scenario. The MR-DC scenario is similar to the EN-DC scenario. A difference lies in that a master node in the EN-DC scenario is an LTE base station (eNB) and is connected to an LTE core network, a master node in the MR-DC scenario is an NR base station (gNB) and is connected to an NR core network, and an interface between the MN and the SN is an X2/Xn interface. Others are similar, and details are not described herein.

For PRACH resource processing processes in the MR-DC scenario and the EN-DC scenario, refer to the steps in the foregoing embodiments. Details are not described herein again.

It should be noted that this embodiment is also applicable to an LTE multi-connectivity data transmission scenario and an LTE and WLAN multi-connectivity data transmission scenario, and details are not described herein.

In this embodiment of this application, coordinating the BFR/OSI-specific PRACH resource is introduced, thereby avoiding mutual interference generated because neighboring cells use a same preamble sequence when the BFR/OSI occurs. In addition, PRACH resource coordination of the DU in the CU-DU architecture and PRACH resource coordination of the SN in the EN-DC architecture and the MR-DC architecture are considered, thereby reducing interference between DUs and interference between SNs.

Embodiment 5

The physical random access channel (PRACH) resource processing method shown in this embodiment is used in an NR CU-DU architecture. In the NR CU-DU architecture, a first access device shown in this embodiment is a gNB-CU, which is simply referred to as a CU, and a third access device is a gNB-DU, which is simply referred to as a DU. When one CU supports a plurality of DUs, referring to FIG. 13, another embodiment of the PRACH resource processing method in the embodiments of this application includes the following steps.

Possible Implementation 1:

1301: The first access device sends third information to the third access device.

The third access device shown in this embodiment may be one of at least one access device supported by the first access device, the third information includes PRACH resource information of a neighboring cell of the third access device, and the neighboring cell of the third access device is a neighboring cell of a cell served by the third access device. The PRACH resource information of the neighboring cell includes PRACH resource information of a direct neighboring cell and PRACH resource information of an indirect neighboring cell, the direct neighboring cell is a cell that is directly neighboring to the cell and is referred to as the direct neighboring cell, and the indirect neighboring cell is a neighboring cell of the direct neighboring cell of the cell and is referred to as the indirect neighboring cell. The neighboring cell of the third access device may be determined by the first access device, or may be determined in another manner. This is not limited herein in this embodiment of this application.

Specifically, the third information may include at least one neighboring cell of a first target cell served by the third access device, and the first target cell is any cell served by the third access device. A specific quantity of first target cells is not limited in this application, that is, there are one or more first target cells.

Optionally, the third access device may request, from the first access device, to obtain the third information of the first target cell served by the third access device. Specifically, the third access device may send an identity of the first target cell served by the third access device and/or an identity of a second target cell served by the first access device to the first access device, and the first access device sends the third information to the third access device. The second target cell is any one or more cells served by the first access device, that is, the second target cell is a direct neighboring cell of the first target cell served by the third access device. It should be noted that, in this case, the third access device may obtain information about the second target cell from the first access device in advance. A specific quantity of second target cells is not limited in this application, that is, there are one or more second target cells.

The PRACH resource information includes at least one of common PRACH resource information, PRACH resource information of BFR, PRACH resource information of OSI, and PRACH resource information of an uplink carrier. The common PRACH resource information may be understood as PRACH resource information universal for each cell served by the third access device, that is, PRACH resource information universal for the BFR, the OSI, the uplink carrier, or a supplementary uplink carrier. The PRACH resource information of the uplink carrier includes PRACH resource information of a normal uplink carrier and/or PRACH resource information of the supplementary uplink carrier.

Specifically, for example, the PRACH resource information may separately include the common PRACH resource information. For another example, the PRACH resource information may separately include the PRACH resource information of the BFR. For another example, the PRACH resource information may separately include the PRACH resource information of the OSI. For another example, the PRACH resource information may separately include the PRACH resource information of the uplink carrier.

Specifically, for another example, the PRACH resource information may include a combination of any two of the common PRACH resource information, the PRACH resource information of the BFR, the PRACH resource information of the OSI, and the PRACH resource information of the uplink carrier. A specific combination manner is not limited. For example, the PRACH resource information may include the common PRACH resource information and the PRACH resource information of the BFR.

Specifically, for another example, the PRACH resource information may include a combination of any three of the common PRACH resource information, the PRACH resource information of the BFR, the PRACH resource information of the OSI, and the PRACH resource information of the uplink carrier. A specific combination manner is not limited. For example, the PRACH resource information may include the common PRACH resource information, the PRACH resource information of the BFR, and the PRACH resource information of the OSI.

Specifically, for another example, the PRACH resource information may include all information in the common PRACH resource information, the PRACH resource information of the BFR, the PRACH resource information of the OSI, and the PRACH resource information of the uplink carrier.

For example, the third access device may include a cell 1, a cell 2, and a cell 3. Neighboring cells of the cell 1 include the cell 2, the cell 3, a cell 4, and a cell 5, the cell 2 and the cell 3 are direct neighboring cells of the cell 1, and the cell 4 and the cell 5 are indirect neighboring cells of the cell 1. Neighboring cells of the cell 2 include the cell 1, the cell 3, the cell 4, and the cell 5, the cell 1 and the cell 3 are direct neighboring cells of the cell 2, and the cell 4 and the cell 5 are indirect neighboring cells of the cell 2. Neighboring cells of the cell 3 include the cell 1, the cell 2, a cell 6, and a cell 7, the cell 2 and the cell 1 are direct neighboring cells of the cell 3, and the cell 6 and the cell 7 are indirect neighboring cells of the cell 3. Therefore, PRACH resources of the neighboring cells of the cell 1 include PRACH resources of the cell 2, the cell 3, the cell 4, and the cell 5, PRACH resources of the neighboring cells of the cell 2 include PRACH resources of the cell 1, the cell 3, the cell 4, and the cell 5, and PRACH resources of the neighboring cells of the cell 3 include PRACH resources of the cell 2, the cell 1, the cell 6, and the cell 7. The third information sent by the first access device to the third access device includes at least one of PRACH resource information of the neighboring cells of the cell 1, PRACH resource information of the neighboring cells of the cell 2, and PRACH resource information of the neighboring cells of the cell 3. The cell 4, the cell 5, the cell 6, and the cell 7 may be cells served by another access device (for example, herein, the first access device is a CU 1, the third access device is a DU 1 served by the CU 1, and the another access device is a DU 2 served by the CU 1, or the another access device is a DU served by a CU 2), or may be cells served by another base station. This is not limited herein in this embodiment of this application.

Optionally, before this step, the first access device may obtain PRACH resource information of a cell served by at least one of a neighboring base station, a fourth access device, and a fifth access device. The fourth access device is an access device neighboring to the first access device. For example, if the first access device is the CU 1, the fourth access device may be the CU 2 neighboring to the CU 1 or a gNB neighboring to the CU 1. The fifth access device is an access device neighboring to the third access device. For example, if the third access device is the DU 1 served by the CU 1, the fifth access device is the DU 2 served by the CU 1 and/or the DU served by the CU 2 neighboring to the CU 1.

Specifically, the first access device may obtain PRACH resource information of a cell of each third access device served by the first access device, for example, through an X2, Xn, or F1 interface between the first access device and the third access device. Alternatively, the first access device may further obtain PRACH resource information of a cell served by the fourth access device, the neighboring base station, or the fifth access device, for example, through an X2/Xn interface. The first access device may determine the neighboring cell of the third access device based on the obtained information, that is, determine the neighboring cell of the cell served by the first access device. The process may be performed before this step, or may be performed before another possible step. This is not limited herein in this embodiment of this application.

Optionally, the first access device may further obtain a neighboring degree of at least one of the neighboring base station, the neighboring cell, the fourth access device, and the fifth access device. Specifically, the first access device may send a request to the at least one of the neighboring base station, the neighboring cell, the fourth access device, and the fifth access device, so that the at least one of the neighboring base station, the neighboring cell, the fourth access device, and the fifth access device returns the neighboring degree to the first access device based on the request, where the neighboring degree is a neighboring degree of at least one cell served by the first access device and the cell served by the at least one of the neighboring base station, the fourth access device, and the fifth access device. The neighboring degree may be one or more of direct neighboring, indirect neighboring, and a specific distance. The neighboring degree may be identified by using 0, 1, 2, or the like (where 0 represents the direct neighboring, 1 represents the indirect neighboring, and 2 represents the specific distance). Alternatively, the neighboring degree may be represented in another manner. This is not limited herein in this embodiment of this application. Optionally, the first access device may further send an indication to the at least one of the neighboring base station, the fourth access device, and the fifth access device, where the indication is used to request to obtain neighboring cell information of a specific cell, and the indication may be carried in an existing X2/Xn/F1 message or a newly defined message. This is not limited herein in this embodiment of this application.

It should be noted that, in this embodiment of the present invention, interaction between the first access device and the third access device may be performed through an existing interface message such as an X2 interface message, an Xn interface message, an F1 interface message, or a V1 interface message, or a message in another form. This is not limited herein in this embodiment of this application.

1302: The third access device optimizes a random access channel RACH based on the third information.

The third access device optimizes the random access channel RACH based on the PRACH resource information of the neighboring cell of the third access device. It may be understood that, the third access device optimizes the random access channel RACH based on the PRACH resource information of the neighboring cell of the third access device. Specifically, the third access device determines, based on PRACH resource information of a neighboring cell of each cell served by the third access device, whether random access channel RACH optimization needs to be performed on a PRACH resource of the cell served by the third access device. If determining that a PRACH resource of a cell needs to be optimized, the third access device reconfigures a PRACH resource for the cell; or the third access device notifies OAM, and the OAM configures a PRACH resource for the cell. This is not limited herein in this embodiment of this application.

For example, the third access device receives PRACH resource information, sent by the first access device, of a neighboring cell of the cell 1 served by the third access device. The third access device determines whether a conflict occurs between PRACH resource information of the cell 1 and the PRACH resource information of the neighboring cell. If the conflict occurs, the third access device reconfigures a PRACH resource for the cell 1.

1303: The third access device sends an optimized PRACH resource to the first access device.

Step 1303 shown in this embodiment is an optional step. In this embodiment of this application, the third access device obtains the third information sent by the first access device, where the third information includes the PRACH resource information of the neighboring cell of the third access device, so that the third access device can optimize the random access channel RACH based on the third information, thereby avoiding a PRACH resource conflict between cells served by the first access device.

Further, optionally, the third access device may alternatively send the third information to the OAM, and the OAM performs processing based on the third information. For a specific process in which the OAM performs processing based on the third information, refer to the foregoing process in which the third access device performs processing based on the third information. Details are not described again. For example, if the OAM optimizes the random access channel RACH based on the third information, a PRACH resource conflict between cells served by the first access device is avoided, and the OAM may send the optimized PRACH resource to the third access device.

Figure 14:
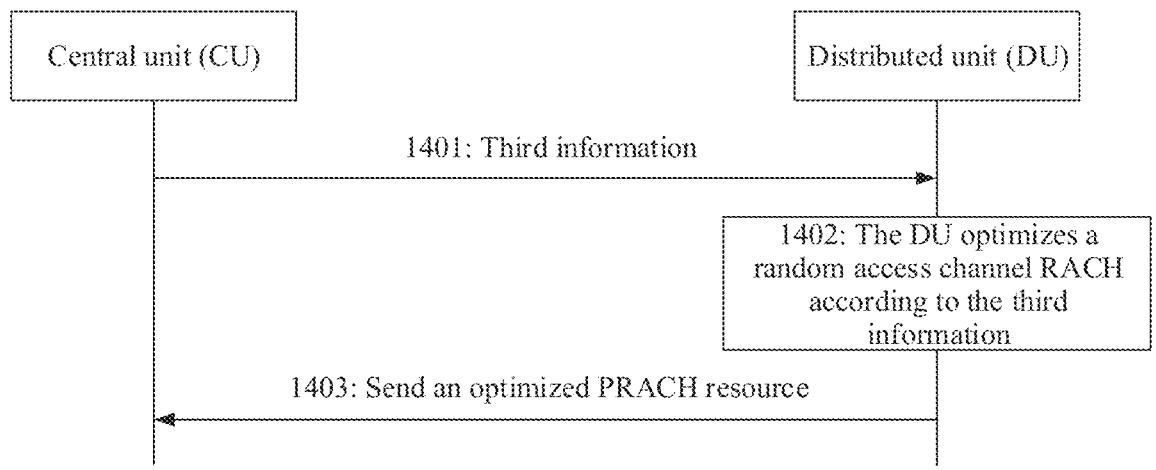
FIG. 14 is a schematic diagram of another embodiment of a physical random access channel PRACH resource processing method according to an embodiment of this application.

To better understand Embodiment 5, Embodiment 5 is described in detail below with reference to a specific application scenario shown in FIG. 14. In this application scenario, an NR CU-DU architecture is used as an example. To be specific, the first access device is a gNB-CU, which is simply referred to as a CU, and the third access device is a gNB-DU, which is simply referred to as a DU. When one CU supports a plurality of DUs, that is, in an intra CU scenario, FIG. 14 shows a possible implementation 1 of the PRACH resource processing method in the embodiments of this application.

1401: The CU sends third information to the DU.

The third information includes PRACH resource information of a neighboring cell of the DU. The neighboring cell of the DU is at least one neighboring cell of a first target cell served by the DU. The first target cell may be at least one cell served by the DU. A specific quantity of first target cells is not limited in this application. For a specific description of a meaning of the neighboring cell, refer to the description of FIG. 13. Details are not described again. For a specific description of the PRACH resource information, refer to the description of FIG. 13. Details are not described again.

Optionally, before this step, the CU may obtain PRACH resource information of a cell served by at least one of a neighboring base station, a neighboring CU, and a neighboring DU. The neighboring DU further includes another DU served by the CU. Specifically, the CU may obtain PRACH resource information of a cell served by each DU served by the CU, for example, through an F1 interface between the CU and the DU. Alternatively, the CU may further obtain PRACH resource information of a cell served by the neighboring CU, the neighboring base station, or the neighboring DU of the CU, for example, through an X2/Xn interface. The CU may determine the neighboring cell of the DU based on the obtained information, that is, determine a neighboring cell of a cell served by the CU. The process may be performed before this step, or may be performed before another possible step. This is not limited herein in this embodiment of this application. Optionally, the CU may further obtain a neighboring degree of at least one of the neighboring base station, the neighboring cell, the neighboring CU, and the neighboring DU, where the neighboring degree is a neighboring degree of the cell served by the CU and the cell served by the at least one of the neighboring base station, the neighboring CU, and the neighboring DU. For a specific description of the neighboring degree, refer to that in FIG. 13. Details are not described again.

1402: The DU optimizes a random access channel RACH based on the third information.

The DU optimizes the random access channel RACH based on the PRACH resource information of the neighboring cell of the DU. Specifically, the DU determines, based on PRACH resource information of a neighboring cell of each cell served by the DU, whether random access channel RACH optimization needs to be performed on a PRACH resource configuration of the cell served by the DU. If determining that a PRACH resource of a cell needs to be optimized, the DU reconfigures a PRACH resource for the cell; or the DU notifies OAM, and the OAM configures a PRACH resource for the cell. This is not limited herein in this embodiment of this application.

For example, the DU receives PRACH resource information, sent by the CU, of a neighboring cell of a cell 1 served by the DU, the DU determines whether a conflict occurs between PRACH resource information of the cell 1 and the PRACH resource information of the neighboring cell. If the conflict occurs, the DU reconfigures a PRACH resource for the cell 1.

1403: The DU sends an optimized PRACH resource to the CU.

Specifically, this step is an optional step, and whether to perform this step is not limited in this application scenario.

In this application scenario, the DU obtains the third information sent by the CU, where the third information includes the PRACH resource information of the neighboring cell of the DU, so that the DU can optimize the random access channel RACH based on the third information, thereby avoiding a PRACH resource conflict between the CU and the DU.

Further, optionally, the DU may alternatively send the third information to the OAM, and the OAM performs processing based on the third information. For a specific process in which the OAM performs processing based on the third information, refer to the foregoing process in which the DU performs processing based on the third information. Details are not described again. For example, if the OAM optimizes the random access channel RACH based on the third information, a PRACH resource conflict between cells served by the CU is avoided, and the OAM may send the optimized PRACH resource to the DU.

It may be understood that, in the foregoing method embodiments, the methods/steps implemented by the access device may alternatively be implemented by a component (for example, a chip or a circuit) that can be used in the access device.

Figure 9:
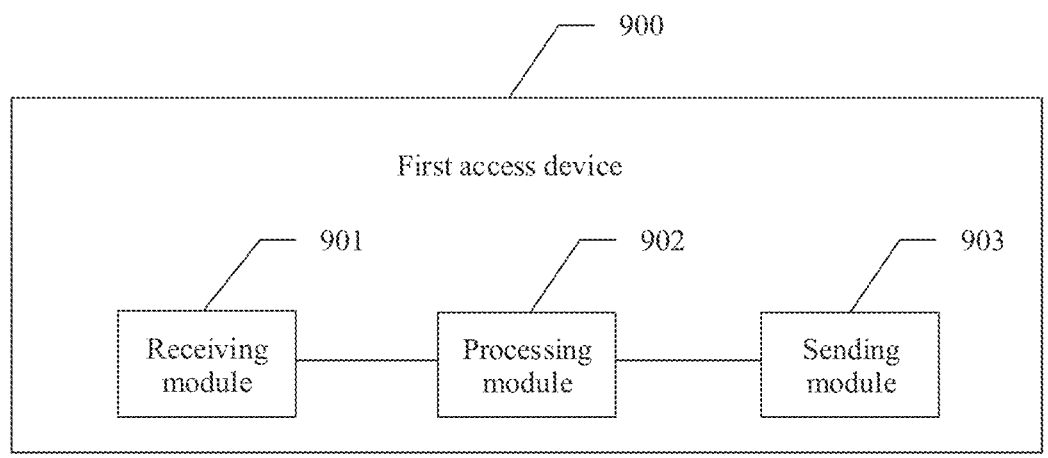
FIG. 9 is a schematic diagram of an embodiment of an access device according to an embodiment of this application.

The foregoing describes the PRACH resource processing method in the embodiments of this application. The following describes an access device in the embodiments of this application. Referring to FIG. 9, a first access device shown in an embodiment of this application is configured to perform the steps performed by the first access device shown in FIG. 2, FIG. 3, FIG. 4, FIG. 5, FIG. 6, and FIG. 7. For a specific execution process, refer to FIG. 2, FIG. 3, FIG. 4, FIG. 5, FIG. 6, and FIG. 7. Details are not described again. An embodiment of the first access device 900 in this embodiment of this application includes:

a receiving module 901, configured to receive first information from a second access device, where the first information includes at least one of PRACH resource information of beam failure recovery BFR, PRACH resource information of on-demand system information OSI, and PRACH resource information of an uplink UL carrier; and a processing module 902, configured to perform processing based on the first information.

In this embodiment of this application, the first access device receives the first information sent by the second access device, and optimizes a random access channel RACH based on the at least one, carried in the first information, of the PRACH resource information of the beam failure recovery BFR, the PRACH resource information of the on-demand system information OSI, and the PRACH resource information of the uplink UL carrier, thereby avoiding a conflict between at least one of BFR-specific PRACH resources, OSI-specific PRACH resources, and uplink UL carrier—specific PRACH resources of the first access device and the second access device.

Optionally, the PRACH resource information of the uplink UL carrier includes PRACH resource information of a normal uplink carrier and/or PRACH resource information of a supplementary uplink carrier, thereby avoiding a conflict between normal uplink carrier—specific PRACH resources and/or supplementary uplink carrier—specific PRACH resources of the first access device and the second access device.

Optionally, the first information further includes common PRACH resource information, or common PRACH resource information and a long/short format indication of a common PRACH resource.

Optionally, the PRACH resource information includes at least one of a root sequence index, a cyclic shift, a high speed flag, a PRACH frequency offset, and a PRACH configuration index.

Optionally, the first access device 900 further includes: a sending module 903, configured to send a first indication to the second access device, where the first indication includes at least one of a PRACH resource conflict indication, a PRACH resource conflict type, a candidate resource list of a PRACH resource, and a long/short format indication of the PRACH resource.

Optionally, the PRACH resource conflict type includes at least one of a common PRACH resource conflict, a PRACH resource conflict of the BFR, a PRACH resource conflict of the OSI, and a PRACH resource conflict of the uplink carrier.

Optionally, the PRACH resource conflict of the uplink carrier includes a PRACH resource conflict of the normal uplink carrier and/or a PRACH resource conflict of the supplementary uplink carrier.

Optionally, the first indication further includes a candidate PRACH resource.

Optionally, the first access device is a first new radio NR base station, and the second access device is a second NR base station; or the first access device is a central unit CU, and the second access device is a distributed unit DU; or the first access device is a distributed unit DU, and the second access device is a central unit CU; or the first access device is an NR base station, and the second access device is a long time evolution LTE base station; or the first access device is an LTE base station, and the second access device is an NR base station.

It may be understood that, for functions or operations implemented by the modules of the first access device in this embodiment of this application, further refer to the descriptions in the method embodiments. Details are not described herein again. It may be understood that the foregoing modules may be integrated together, or may be disposed independently. This is not limited in this embodiment of this application.

Figure 10:
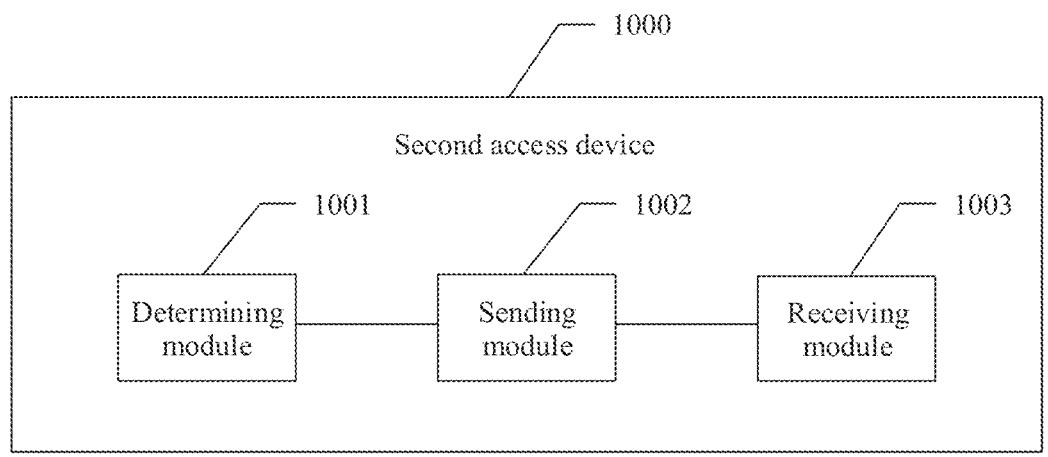
FIG. 10 is a schematic diagram of another embodiment of an access device according to an embodiment of this application.

Referring to FIG. 10, a second access device shown in an embodiment of this application is configured to perform the steps performed by the second access device shown in FIG. 2, FIG. 3, FIG. 4, FIG. 5, FIG. 6, and FIG. 7. For a specific execution process, refer to FIG. 2, FIG. 3, FIG. 4, FIG. 5, FIG. 6, and FIG. 7. Details are not described again. An embodiment of the second access device 1000 in this embodiment of this application includes:

a determining module 1001, configured to determine first information, where the first information includes at least one of PRACH resource information of beam failure recovery BFR, PRACH resource information of on-demand system information OSI, and PRACH resource information of an uplink UL carrier; and a sending module 1002, configured to send the first information to a first access device.

In this embodiment of this application, the second access device sends the first information to the first access device, where the first information carries the at least one of the PRACH resource information of the beam failure recovery BFR, the PRACH resource information of the on-demand system information OSI, and the PRACH resource information of the uplink UL carrier, so that the first access device optimizes a random access channel RACH, thereby avoiding a conflict between at least one of BFR-specific PRACH resources, OSI-specific PRACH resources, and uplink UL carrier—specific PRACH resources of the first access device and the second access device.

Optionally, the PRACH resource information of the uplink UL carrier includes PRACH resource information of a normal uplink carrier and/or PRACH resource information of a supplementary uplink carrier.

Optionally, the first information further includes common PRACH resource information, or common PRACH resource information and a long/short format indication of a common PRACH resource.

Optionally, the PRACH resource information includes at least one of a root sequence index, a cyclic shift, a high speed flag, a PRACH frequency offset, and a PRACH configuration index.

Optionally, the second access device 1000 further includes: a receiving module 1003, configured to receive a first indication from the first access device, where the first indication includes at least one of a PRACH resource conflict indication, a PRACH resource conflict type, a candidate resource list of a PRACH resource, and a long/short format indication of the PRACH resource.

Optionally, the PRACH resource conflict type includes at least one of a common PRACH resource conflict, a PRACH resource conflict of the BFR, a PRACH resource conflict of the OSI, and a PRACH resource conflict of the uplink carrier.

Optionally, the PRACH resource conflict of the uplink carrier includes a PRACH resource conflict of the normal uplink carrier and/or a PRACH resource conflict of the supplementary uplink carrier.

Optionally, the first access device is a first new radio NR base station, and the second access device is a second NR base station; or the first access device is a central unit CU, and the second access device is a distributed unit DU; or the first access device is a distributed unit DU, and the second access device is a central unit CU; or the first access device is an NR base station, and the second access device is a long time evolution LTE base station; or the first access device is an LTE base station, and the second access device is an NR base station.

Optionally, the first indication further includes a candidate PRACH resource.

Figure 13:
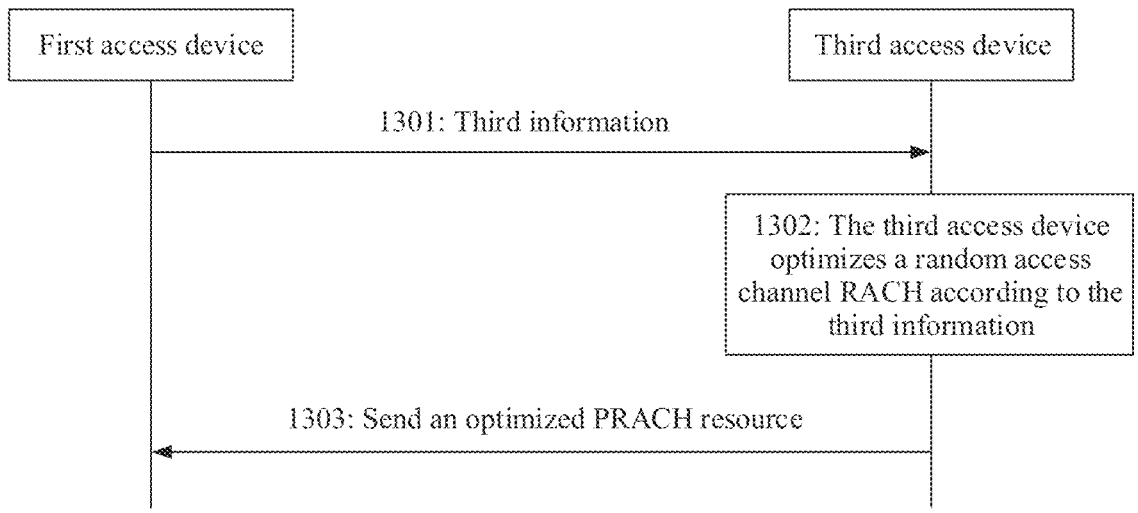
FIG. 13 is a schematic diagram of another embodiment of a physical random access channel PRACH resource processing method according to an embodiment of this application.
Figure 15:
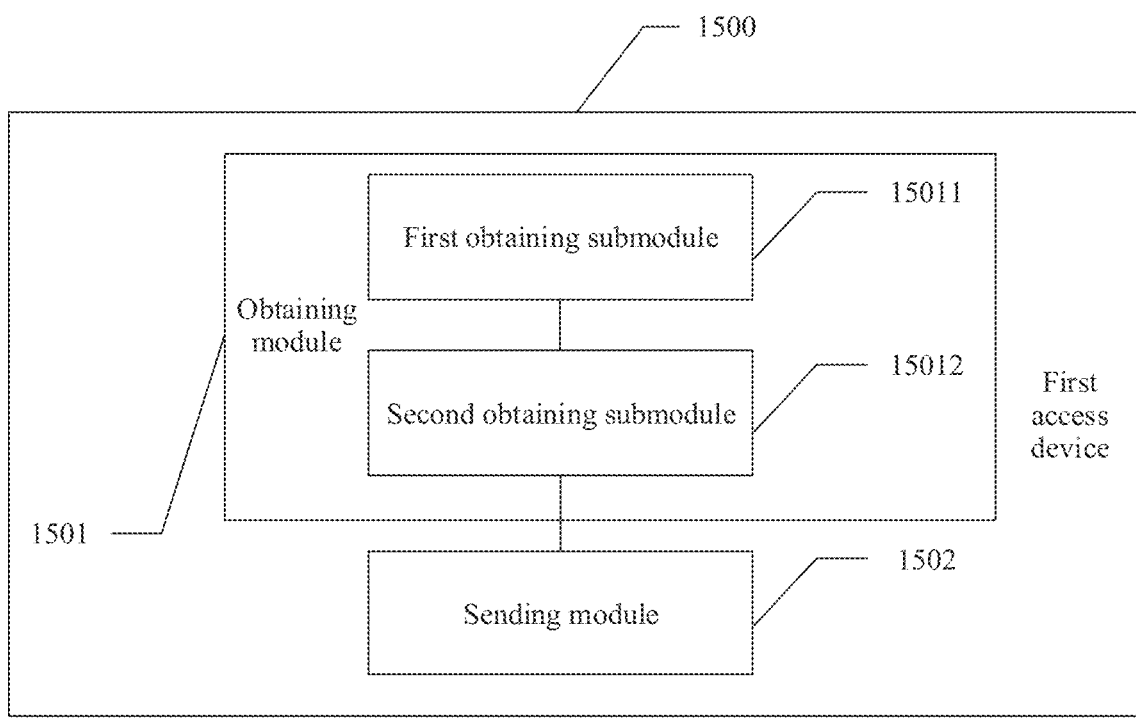
FIG. 15 is a schematic diagram of another embodiment of an access device according to an embodiment of this application.

Further, referring to FIG. 15, a first access device shown in an embodiment of this application is configured to perform the steps performed by the first access device shown in FIG. 13 and FIG. 14. For a specific execution process, refer to FIG. 13 and FIG. 14. Details are not described again. An embodiment of the first access device 1500 in this embodiment of this application includes:

an obtaining module 1501, configured to obtain third information, where the third information includes PRACH resource information of at least one neighboring cell of a third access device, and the PRACH resource information includes at least one of PRACH resource information of beam failure recovery BFR, PRACH resource information of on-demand system information OSI, common PRACH resource information, and PRACH resource information of an uplink UL carrier; and a sending module 1502, used by the device to send the third information to the third access device.

In this application, the first access device sends the third information to the third access device. Therefore, the third access device can optimize a random access channel RACH based on the third information, thereby avoiding a PRACH resource conflict between cells served by the first access device.

Optionally, the PRACH resource information of the uplink UL carrier includes PRACH resource information of a normal uplink carrier and/or PRACH resource information of a supplementary uplink carrier.

Optionally, the third information further includes a long/short format indication of a common PRACH resource.

Optionally, the PRACH resource information includes at least one of a root sequence index, a cyclic shift, a high speed flag, a PRACH frequency offset, and a PRACH configuration index.

Optionally, the third access device is one of at least one access device supported by the first access device, and the neighboring cell of the third access device is a neighboring cell of a cell served by the third access device.

Optionally, the obtaining module 1501 includes:

a first obtaining submodule 15011, configured to obtain the PRACH resource information from a cell served by at least one of a neighboring base station, a fourth access device, and a fifth access device, where the fourth access device is an access device neighboring to the first access device, and the fifth access device is an access device neighboring to the third access device; and a second obtaining submodule 15012, configured to determine the PRACH resource information of the neighboring cell of the third access device based on the obtained PRACH resource information.

Optionally, the PRACH resource information obtained by the first obtaining submodule 15011 includes at least one neighboring degree, and the at least one neighboring degree is used to indicate a neighboring degree of a cell served by the first access device and the cell served by the at least one of the neighboring base station, the fourth access device, and the fifth access device, where the fourth access device is the access device neighboring to the first access device, and the fifth access device is the access device neighboring to the third access device.

Optionally, the first access device is a central unit CU, and the third access device is a distributed unit DU.

Figure 16:
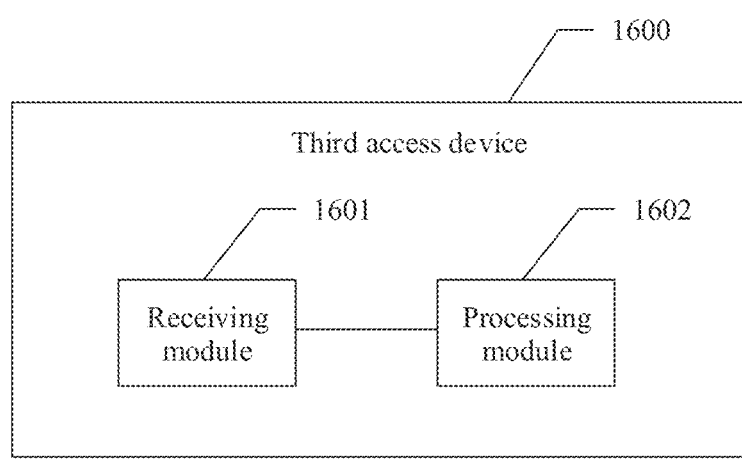
FIG. 16 is a schematic diagram of another embodiment of an access device according to an embodiment of this application.

Further, referring to FIG. 16, a third access device shown in an embodiment of this application is configured to perform the steps performed by the third access device shown in FIG. 13 and FIG. 14. For a specific execution process, refer to FIG. 13 and FIG. 14. Details are not described again. An embodiment of the third access device 1600 in this embodiment of this application includes:

a receiving module 1601, configured to receive third information from a first access device, where the third information includes PRACH resource information of at least one neighboring cell of the third access device, and the PRACH resource information includes at least one of PRACH resource information of beam failure recovery BFR, PRACH resource information of on-demand system information OSI, common PRACH resource information, and PRACH resource information of an uplink UL carrier; and a processing module 1602, configured to perform processing based on the third information.

The third access device performs processing based on the third information. When the third access device performs processing based on the third information, the third access device can optimize a random access channel RACH based on the third information, thereby avoiding a PRACH resource conflict between cells served by the first access device.

Optionally, the PRACH resource information of the uplink UL carrier includes PRACH resource information of a normal uplink carrier and/or PRACH resource information of a supplementary uplink carrier.

Optionally, the third information further includes a long/short format indication of a common PRACH resource.

Optionally, the PRACH resource information includes at least one of a root sequence index, a cyclic shift, a high speed flag, a PRACH frequency offset, and a PRACH configuration index.

Optionally, the third access device is one of at least one access device supported by the first access device, and the neighboring cell of the third access device is a neighboring cell of a cell served by the third access device.

Optionally, the PRACH resource information includes at least one neighboring degree, and the at least one neighboring degree is used to indicate a neighboring degree of a cell served by the first access device and a cell served by at least one of a neighboring base station, a fourth access device, and a fifth access device, where the fourth access device is an access device neighboring to the first access device, and the fifth access device is an access device neighboring to the third access device.

Optionally, the first access device is a central unit CU, and the third access device is a distributed unit DU.

Figure 11:
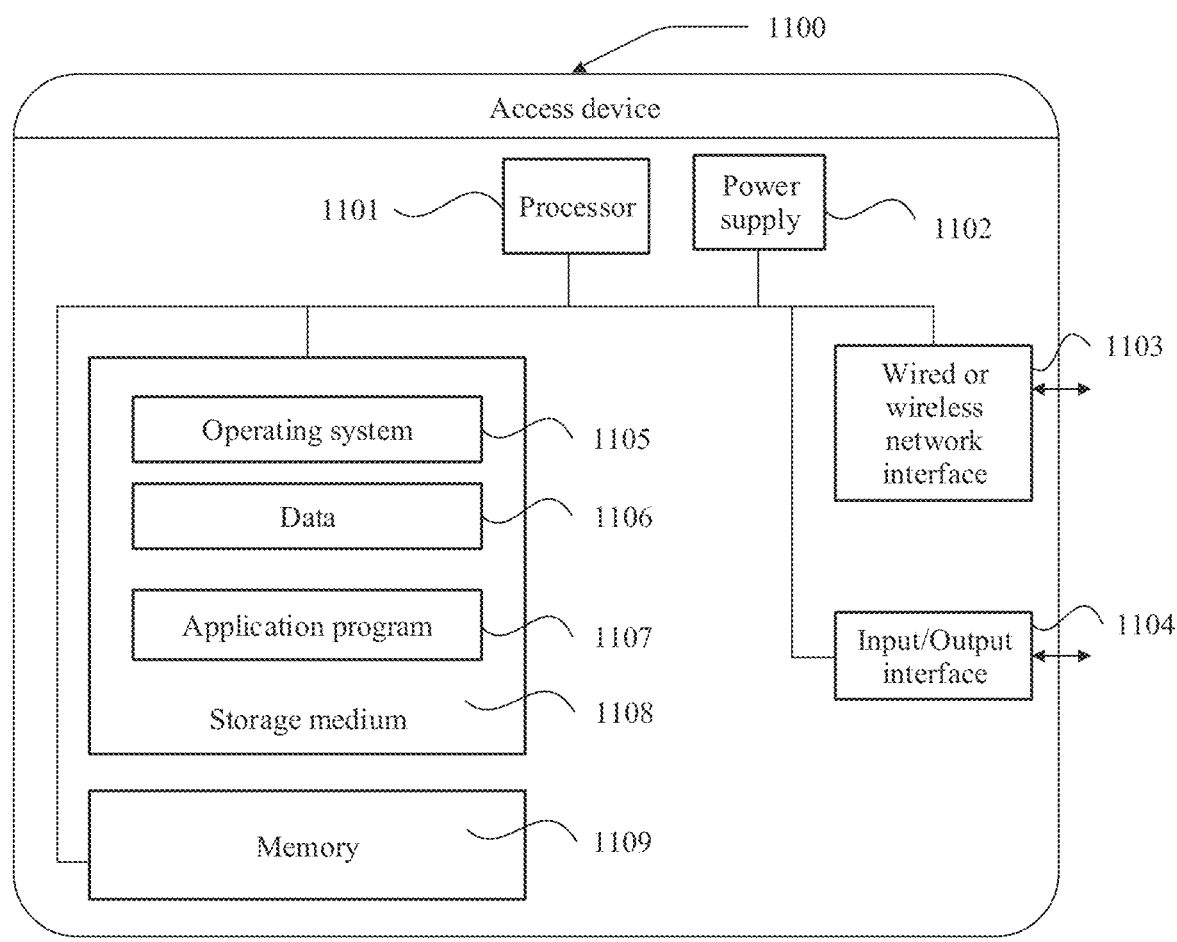
FIG. 11 is a schematic diagram of another embodiment of an access device according to an embodiment of this application.

FIG. 11 is a schematic structural diagram of an access device according to an embodiment of this application. The access device 1100 may vary greatly due to different configurations or performance. The access device 1100 may include one or more processors (central processing units, CPU) 1101 (for example, one or more processors), one or more memories 1109, and one or more storage media 1108 (for example, one or more mass storage devices) for storing an application program 1107 or data 1106. The memory 1109 and the storage medium 1108 may be transient storage or persistent storage. The program stored in the storage medium 1108 may include one or more modules (not shown in the figure), and each module may include a series of instruction operations performed on the access device. Further, the processor 1101 may be configured to: communicate with the storage medium 1108, and perform, on the access device 1100, the series of instruction operations in the storage medium 1108.

The access device 1100 may further include one or more power supplies 1102, one or more wired or wireless network interfaces 1103, one or more input/output interfaces 1104, and/or one or more operating systems 1105, such as Windows Serve, Mac OS X, Unix, Linux, and FreeBSD. A person skilled in the art may understand that the structure of the access device shown in FIG. 11 does not constitute a limitation on the access device, and may include more or fewer components than those shown in the figure, or may combine some components, or may have different component arrangements.

The following specifically describes constituent components of the access device with reference to FIG. 11.

The processor 1101 may perform processing according to a specified PRACH resource processing method. The processor 1101 connects various components of the entire access device through various interfaces and lines, and performs various functions and data processing of the access device by running or executing a software program and/or a module stored in the memory 1109 and invoking data stored in the memory 1109, to implement PRACH resource coordination or optimization.

The memory 1109 may be configured to store the software program and the module. The processor 1101 performs various function applications and data processing of the access device 1100 by running the software program and the module stored in the memory 1109. The memory 1109 may mainly include a program storage area and a data storage area. The program storage area may store an operating system, an application program required by at least one function (for example, sending of first information), and the like. The data storage area may store data (for example, a PRACH resource conflict type) created according to use of the access device, and the like. In addition, the memory 1109 may include a high speed random access memory, and may further include a nonvolatile memory such as at least one magnetic disk storage device, a flash memory, or another volatile solid-state storage device. A program of the PRACH resource processing method provided in this embodiment of this application and a received data stream are stored in the memory. When the program and the received data stream need to be used, the processor 1101 invokes the program and the received data stream from the memory 1109.

Figure 12A:
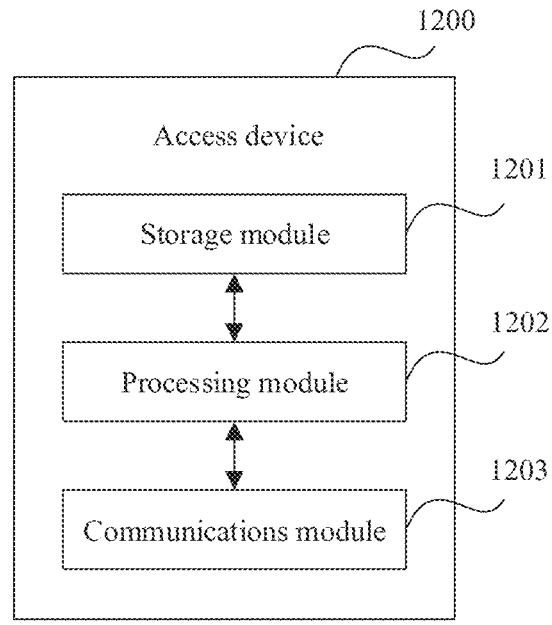
FIG. 12A is a schematic diagram of another embodiment of an access device according to an embodiment of this application.

FIG. 12A is a schematic structural diagram of an access device according to an embodiment of this application. When an integrated module is used, FIG. 12A is a possible schematic structural diagram of the access device in the foregoing embodiment. An access device 1200 includes a processing module 1202 and a communications module 1203. The processing module 1202 is configured to control and manage an action of the access device. For example, the processing module 1202 is configured to support the access device in performing step 202, step 204, step 302, step 304, step 403, step 405, step 501, step 503, step 603, step 605, step 703, and step 705 in the foregoing embodiments, and/or another process used for the technology described in this specification. The communications module 1203 is configured to support the access device in communicating with another network entity. Optionally, the access device may further include a storage module 1201, configured to store program code and data of the access device.

It may be understood that the processing module 1202 may specifically perform a function of the processing module 902 in FIG. 9, and the processing module 1202 may perform a function of the determining module 1001 in FIG. 10. The processing module 1202 may specifically perform a function of the obtaining module 1501 in FIG. 15, and the processing module 1202 may specifically perform a function of the processing module 1602 in FIG. 16. The communications module 1203 may specifically perform functions of the receiving module 901 and the sending module 903 in FIG. 9, and the communications module 1203 may perform functions of the sending module 1002 and the receiving module 1003 in FIG. 10. The communications module 1203 may perform a function of the sending module 1502 in FIG. 15, and the communications module 1203 may perform a function of the receiving module 1601 in FIG. 16.

The processing module 1202 may be a processor or a controller, such as may be a central processing unit (CPU), a general-purpose processor, a digital signal processor (DSP), an application-specific integrated circuit (ASIC), a field programmable gate array (FPGA), or another programmable logic component, a transistor logic device, a hardware component, or any combination thereof. The processor may implement or execute various example logical blocks, modules, and circuits described with reference to content disclosed in this application. Alternatively, the processor may be a combination of implementing a computing function, for example, a combination of one or more microprocessors, or a combination of a DSP and a microprocessor. The communications module 1203 may be a communications interface, a transceiver, a transceiver circuit, or the like. The communications interface is a general term, and may include one or more interfaces, for example, a transceiver interface. The storage module 1201 may be a memory.

Figure 12B:
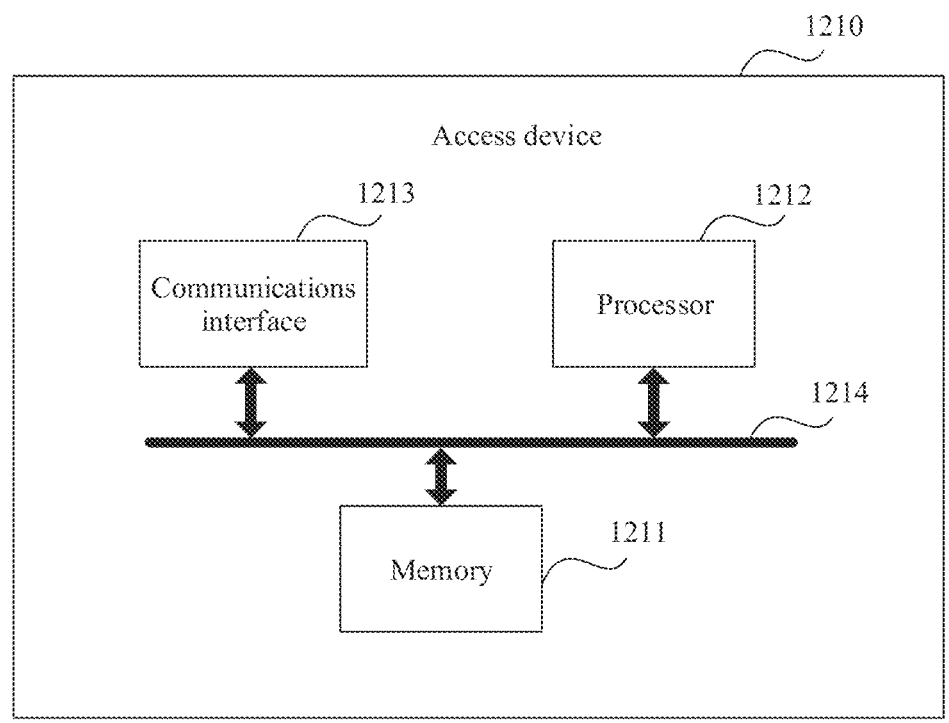
FIG. 12B is a schematic diagram of another embodiment of an access device according to an embodiment of this application.

When the processing module 1202 is a processor, the communications module 1203 is a communications interface, and the storage module 1201 is a memory, the access device in the embodiments of this application may be an access device shown in FIG. 12B.

Referring to FIG. 12B, the access device 1210 includes a processor 1212, a communications interface 1213, and a memory 1211. Optionally, the access device 1210 may further include a bus 1214. The communications interface 1213, the processor 1212, and the memory 1211 may be connected to each other by using the bus 1214. The bus 1214 may be a peripheral component interconnect (PCI) bus, an extended industry standard architecture (EISA) bus, or the like. The bus 1214 may be classified into an address bus, a data bus, a control bus, and the like. For ease of representation, only one thick line is used to represent the bus in FIG. 12B, but this does not mean that there is only one bus or only one type of bus.

Optionally, in some embodiments of this application, the communications interface 1213 is configured to perform step 201 and step 203 in FIG. 2, step 301 and step 303 in FIG. 3, step 401, step 402, and step 404 in FIG. 4, step 502 in FIG. 5, step 601, step 602, and step 604 in FIG. 6, step 701, step 702, and step 704 in FIG. 7, step 1301 and step 1303 in FIG. 13, and step 1401 and step 1403 in FIG. 14. Details are not described herein again.

Optionally, in some embodiments of this application, the processor 1212 is further configured to perform step 202 and step 204 in FIG. 2. Details are not described herein again.

Optionally, in some embodiments of this application, the processor 1212 is further configured to perform step 302 and step 304 in FIG. 3. Details are not described herein again.

Optionally, in some embodiments of this application, the processor 1212 is further configured to perform step 403 and step 405 in FIG. 4. Details are not described herein again.

Optionally, in some embodiments of this application, the processor 1212 is further configured to perform step 501 and step 503 in FIG. 5. Details are not described herein again.

Optionally, in some embodiments of this application, the processor 1212 is further configured to perform step 603 and step 605 in FIG. 6. Details are not described herein again.

The processor 1212 is further configured to perform step 1302 in FIG. 13. Details are not described herein again.

The processor 1212 is further configured to perform step 1402 in FIG. 14. Details are not described herein again.

Optionally, in some embodiments of this application, the processor 1212 is further configured to perform step 703 and step 705 in FIG. 7. Details are not described herein again.

In the embodiments of this application, the second access device sends the first information to the first access device, where the first information includes the at least one of the PRACH resource information of the beam failure recovery BFR, the PRACH resource information of the on-demand system information OSI, and the PRACH resource information of the uplink UL carrier, so that the first access device optimizes the random access channel (RACH) based on the first information, thereby avoiding a conflict between at least one of the BFR-specific PRACH resources, the OSI-specific PRACH resources, the uplink UL carrier—specific PRACH resources, the normal uplink carrier—specific PRACH resources, and the supplementary uplink carrier—specific PRACH resources of the first access device and the second access device.

The computer in this application may be an apparatus that performs functions of the modules in the foregoing embodiments. The computer may be an apparatus that integrates the functional modules in the foregoing embodiments. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the integrated module (for example, the storage module 1201, the processing module 1202, and the communications module 1203) is implemented in a form of a software functional module and sold or used as an independent product, the integrated module may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method comprising:
   receiving, by a first access device, first information from a second access device, wherein the first information comprises physical random access channel (PRACH) resource information of uplink (UL) carriers of the second access device, wherein the PRACH resource information of the UL carriers comprises PRACH resource information of a normal uplink carrier and PRACH resource information of a supplementary uplink carrier;
   determining, by the first access device, whether there is a conflict between PRACH resource configurations of the first access device and the second access device based on the first information; and
   performing, by the first access device, processing based on a determining result of the conflict, wherein the processing comprises using the first information to optimize a random access channel (RACH), or using the first information to coordinate a RACH, or using the first information to reconfigure a RACH.

2. The method according to claim 1, wherein the first information further comprises:
   common PRACH resource information, or
   the common PRACH resource information and a long/short format indication of a common PRACH resource.

3. The method according to claim 2, wherein the method further comprises:
   sending, by the first access device, a first indication to the second access device, wherein the first indication comprises at least one of a PRACH resource conflict indication, an indication of a PRACH resource conflict type, a candidate resource list of a PRACH resource, or the long/short format indication of a PRACH resource.

4. The method according to claim 3, wherein the indication of the PRACH resource conflict type comprises an indication of a PRACH resource conflict of an uplink carrier of the uplink carriers.

5. The method according to claim 4, wherein the PRACH resource conflict of the uplink carrier comprises a PRACH resource conflict of the normal uplink carrier and/or a PRACH resource conflict of the supplementary uplink carrier.

6. The method according to claim 3, wherein the first indication further comprises a candidate PRACH resource.

7. The method according to claim 1, wherein the PRACH resource information of the uplink carriers comprises at least one of a root sequence index (RootSequenceIndex), a cyclic shift (ZeroCorrelationZoneConfiguration), a high speed flag (HighSpeedFlag), a PRACH frequency offset (PRACH-FrequencyOffset), and a PRACH configuration index (PRACH-ConfigurationIndex).

8. A method comprising:
   determining, by a second access device, first information, wherein the first information comprises physical random access channel (PRACH) resource information of uplink (UL) carriers of the second access device, wherein the PRACH resource information of the UL carriers comprises PRACH resource information of a normal uplink carrier and PRACH resource information of a supplementary uplink carrier; and
   sending, by the second access device, the first information to a first access device, the first information enabling to determine whether there is a conflict between PRACH resource configurations of the first access device and the second access device.

9. The method according to claim 8, wherein the first information further comprises:
   common PRACH resource information, or
   the common PRACH resource information and a long/short format indication of a common PRACH resource.

10. The method according to claim 9, wherein the method further comprises:
    receiving, by the second access device, a first indication from the first access device, wherein the first indication comprises at least one of a PRACH resource conflict indication, an indication of a PRACH resource conflict type, a candidate resource list of a PRACH resource, or a long/short format indication of a PRACH resource.

11. The method according to claim 10, wherein the indication of the PRACH resource conflict type comprises an indication of a PRACH resource conflict of an uplink carrier of the uplink carriers.

12. The method according to claim 11, wherein the PRACH resource conflict of the uplink carrier comprises a PRACH resource conflict of the normal uplink carrier and/or a PRACH resource conflict of the supplementary uplink carrier.

13. The method according to claim 10, wherein the first indication further comprises a candidate PRACH resource.

14. The method according to claim 8, wherein the PRACH resource information of the UL carriers comprises at least one of a root sequence index (RootSequenceIndex), a cyclic shift (ZeroCorrelationZoneConfiguration), a high speed flag (HighSpeedFlag), a PRACH frequency offset (PRACH-FrequencyOffset), and a PRACH configuration index (PRACH-ConfigurationIndex).

15. A communications system, comprising a first access device and a second access device, wherein:
    the second access device is configured to:
      determine first information, wherein the first information comprises physical random access channel (PRACH) resource information of uplink (UL) carriers of the second access device, wherein the PRACH resource information of the UL carriers comprises PRACH resource information of a normal uplink carrier and PRACH resource information of a supplementary uplink carrier; and send the first information to the first access device; and the first access device is configured to:

receive the first information from the second access device;

determine whether there is a conflict between PRACH resource configurations of the first access device and the second access device based on the first information; and perform processing based on a determining result of the conflict, wherein the processing comprises using the first information to optimize a random access channel (RACH), or using the first information to coordinate a RACH, or using the first information to reconfigure a RACH.

16. The system according to claim 15, wherein the PRACH resource information of the UL carriers comprises at least one of a root sequence index (RootSequenceIndex), a cyclic shift (ZeroCorrelationZoneConfiguration), a high speed flag (HighSpeedFlag), a PRACH frequency offset (PRACH-FrequencyOffset), or a PRACH configuration index (PRACH-ConfigurationIndex).

17. The system according to claim 15, wherein the first information further comprises:

common PRACH resource information, or the common PRACH resource information and a long/short format indication of a common PRACH resource.

18. The method according to claim 1, wherein the first information further comprises PRACH resource information of beam failure recovery (BFR) of the second access device or PRACH resource information of on-demand system information (OSI) of the second access device.

19. The method according to claim 8, wherein the first information further comprises PRACH resource information of beam failure recovery (BFR) of the second access device or PRACH resource information of on-demand system information (OSI) of the second access device.

20. The system according to claim 15, wherein the first information further comprises PRACH resource information of beam failure recovery (BFR) of the second access device or PRACH resource information of on-demand system information (OSI) of the second access device.

* * * * *